(12) United States Patent
Kawauchi et al.

(10) Patent No.: US 12,064,705 B2
(45) Date of Patent: Aug. 20, 2024

(54) PERSONAL ASSISTANT CONTROL SYSTEM

(71) Applicant: Living Robot Inc., Fukushima (JP)

(72) Inventors: Yasuhiro Kawauchi, Hiroshima (JP); Tamaki Nakamura, Fukuoka (JP); Osamu Toyama, Fukuoka (JP); Takahiro Inoue, Fukuoka (JP)

(73) Assignee: LIVING ROBOT INC., Fukushima (JP)

( * ) Notice: Subject to any disclaimer, the term of this patent is extended or adjusted under 35 U.S.C. 154(b) by 293 days.

(21) Appl. No.: 17/631,038

(22) PCT Filed: Jul. 30, 2020

(86) PCT No.: PCT/JP2020/029180
§ 371 (c)(1),
(2) Date: Jan. 28, 2022

(87) PCT Pub. No.: WO2021/020490
PCT Pub. Date: Feb. 4, 2021

(65) Prior Publication Data
US 2022/0266161 A1 Aug. 25, 2022

(30) Foreign Application Priority Data

Jul. 30, 2019 (JP) .................................. 2019-139331

(51) Int. Cl.
*A63H 30/04* (2006.01)
*A63H 11/00* (2006.01)
(52) U.S. Cl.
CPC ............. *A63H 30/04* (2013.01); *A63H 11/00* (2013.01)
(58) Field of Classification Search
CPC ........ A63H 30/04; A63H 11/00; G06N 3/008; G06N 20/00; B25J 11/0005
See application file for complete search history.

(56) References Cited

U.S. PATENT DOCUMENTS 10,762,414 B1 * 9/2020 Marggraff ............... G06N 3/008
11,580,454 B2 * 2/2023 Zhang .................. B25J 11/0005
(Continued)

FOREIGN PATENT DOCUMENTS

| CN | 1363074 A | 8/2002 |
| CN | 109676611 A | 4/2019 |

(Continued)

OTHER PUBLICATIONS

International Search Report for Patent Application PCT/JP2020/029180 mailed Oct. 13, 2020; 6 pp.

(Continued)

*Primary Examiner* — Kira Nguyen
(74) *Attorney, Agent, or Firm* — Armstrong Teasdale LLP

(57) ABSTRACT

A personal assistant control system which enables a robotic personal assistant to properly support a user according to the user's growth, includes: a first personal assistant (PA) 1 used in a first period to acquire information from a first sensor group; a second PA 2 used in a second period to acquire information from a second sensor group; and a server 5 connected to the first PA 1 and the second PA 2 via a network and configured to estimate a state of a user 3 based on information acquired from the first or second sensor group. In a third period T3 bridging the first period T1 and the second period T2, the server estimates the state of the user 3 based on information acquired from common sensors which are specific types of sensors included in the first and second sensor groups and configured to acquire common attributes.

16 Claims, 12 Drawing Sheets

(56) References Cited

U.S. PATENT DOCUMENTS

| | | | |
|---|---|---|---|
| 2003/0074107 A1 | 4/2003 | Noma et al. | |
| 2014/0279733 A1* | 9/2014 | Djugash | B25J 19/023 901/46 |
| 2018/0200884 A1* | 7/2018 | Perets | G06N 3/008 |
| 2020/0312109 A1* | 10/2020 | Shionozaki | G08B 25/10 |

FOREIGN PATENT DOCUMENTS

| | | |
|---|---|---|
| EP | 1182610 A1 | 2/2002 |
| JP | 2001222518 A | 8/2001 |
| JP | 2011115936 A | 6/2011 |
| JP | 2014176963 A | 9/2014 |
| JP | 2017100221 A | 6/2017 |
| KR | 20010111503 A | 12/2001 |
| WO | 0159703 A1 | 8/2001 |

OTHER PUBLICATIONS

Hashimoto, Shingi, Engadget, Japanese version online retrieved Sep. 30, 2020; "Sony announces new aibo, a dog-shaped robot that has own curiosity and become a life partner," Nov. 1, 2017; 8 pp.
Written Opinion of the International Searching Authority for Patent Application PCT/JP2020/029180 mailed Oct. 13, 2020; 8 pp.
Office Action for Taiwan Patent Application 109125793 dated Jun. 20, 2022; 6 pp.

* cited by examiner

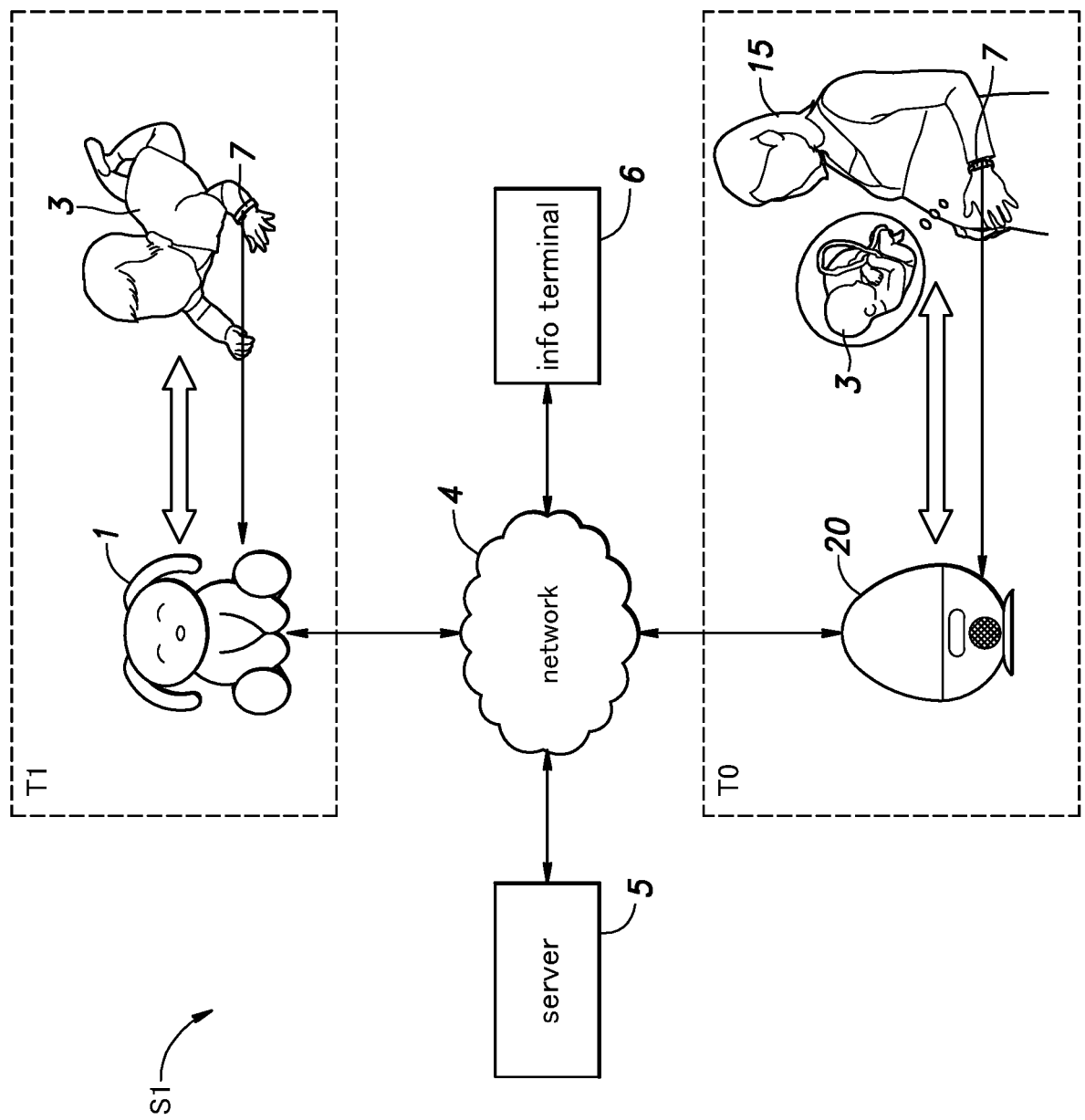

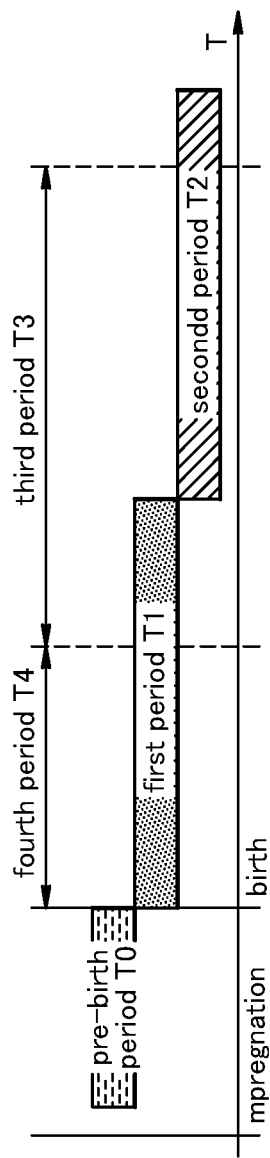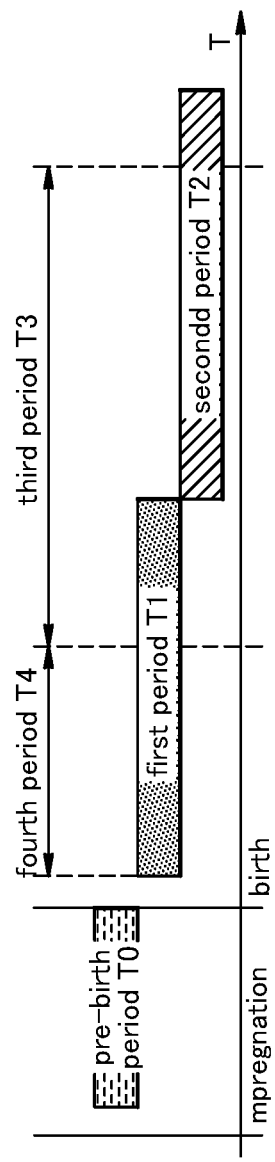
Fig.10A
Fig.10B

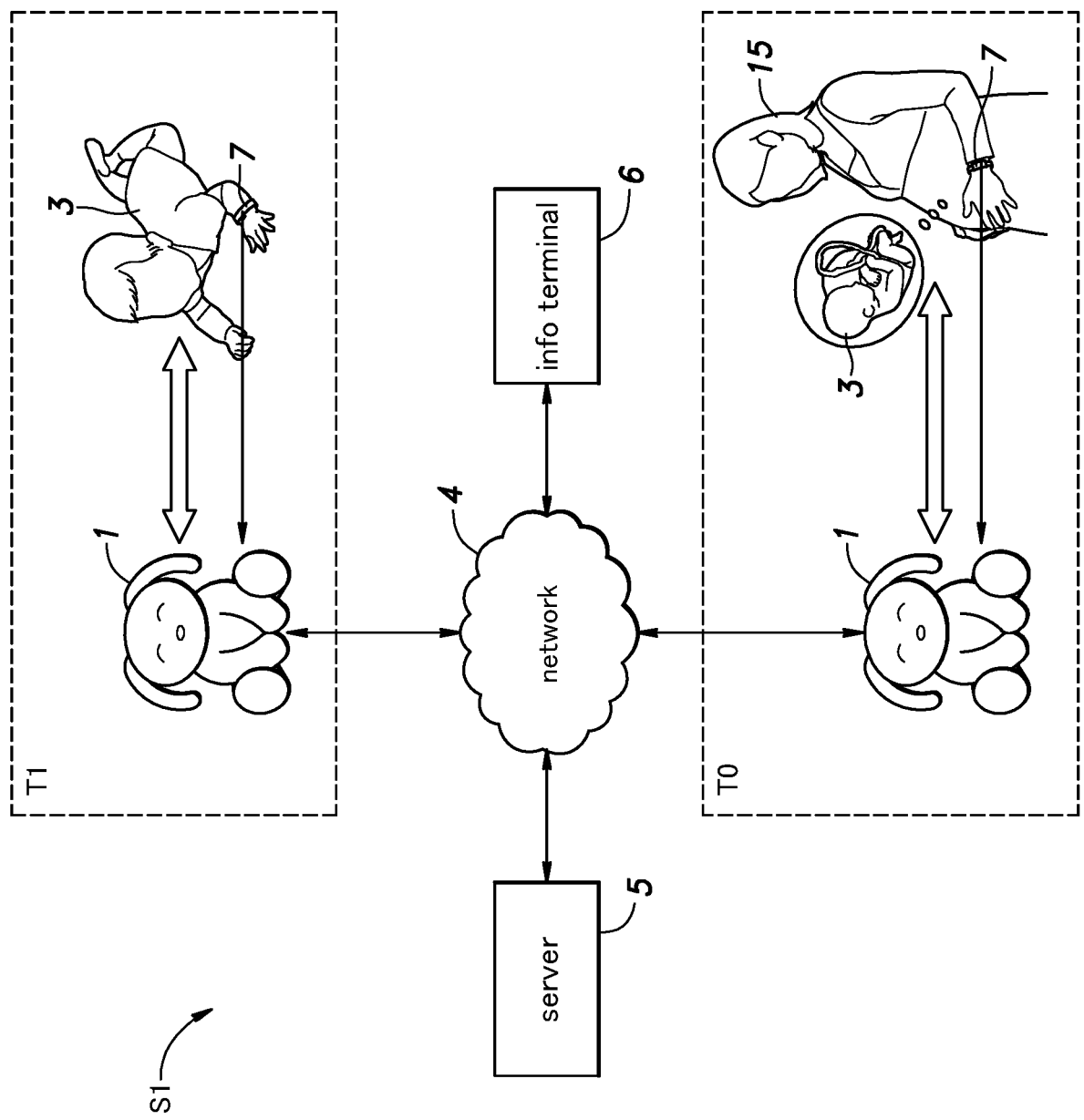

PERSONAL ASSISTANT CONTROL SYSTEM

CROSS-REFERENCE TO RELATED APPLICATIONS

This application is a U.S. National Phase Application of PCT/JP2020/029180 filed Jul. 30, 2020, which claims the benefit of Japanese Patent Application No. 2019-139331 filed Jul. 30, 2019. The content of these applications is hereby expressly incorporated by reference in their entirety.

TECHNICAL FIELD

The present invention relates to a personal assistant control system for controlling a personal assistant device (hereinafter simply referred to as "personal assistant" or "PA") such as a robot, in particular to a personal assistant control system for providing proper services to a user according to the user's growth.

BACKGROUND ART

Most existing robots have been industrial robots mainly used for production automation. Recently, robots for communicating with unspecified people (e.g., robots for providing reception services, concierge services, or product introduction) have started to be used in the society. In the future, it is expected that many robots are owned by individuals, and that their functions as personal assistants are enhanced so as to provide proper services to those individuals. Presently, protector robots for watching over infants and the elderly are being developed.

Examples of known protector robots for watching over infants include communication robots, which are used for small children (infants) who do not have smartphones or other communication devices, and enable voice chat between children and their parents or friends. Regarding protector robots for watching over the elderly, the Ministry of Economy, Trade and Industry and the Ministry of Health, Labor and Welfare in Japan have designated "protection/communications services" as priority areas for use of robot technologies for nursing care. Specifically, the priority areas designated by the authorities include "Platform of equipment using robot technology with overturn detection sensors and external communication functions used in nursing care facilities", and "Life support equipment using robot technology in communication with the elderly or other types of subjects."

Earlier protector devices for watching over a subject were configured to simply detect a state of the subject and notify a supervising person of the detection result. Protector robots have been improved to be able to, in addition to detecting a state of a subject and notifying a supervising person of the detection result, predict a state of the subject and analyze the subject's state upon occurrence of an alert. Furthermore, protector robots connected to a network can accumulate data of actions taken by a subject and data of living conditions of the subject, while watching over the subject. In the case of protector robots for watching over the elderly, for example, utilizing such accumulated data can lead to improvements in care plans and the quality of nursing care.

Known technologies for providing a robot as a personal assistant includes, for example, a computer-based method of actively and automatically providing personal assistance using a robotic device or platform having a processor coupled to at least one sensor, a communications unit, and an output device, the method comprising the steps of: detecting, using the at least one sensor, a first data associated with at least one person within a proximity of at least one of the at least one sensor; detecting, using the at least one sensor, a second data associated with an object, a living being, an event, a place, an environment, or combinations thereof within a proximity of at least one of the at least one sensor; selectively storing, using the processor, a learned data in a database based on the first detected data, the second detected data, a pre-programmed algorithm stored in the database, or combinations thereof; passively outputting, using the communications unit or the output device coupled to or in communication with the processor, a first output data upon a request received by the processor or a predetermined or scheduled event stored in the database; and actively and automatically outputting, using the communications unit or the output device, a second output data based on the first detected data, the second detected data, the learned data, the pre-programmed algorithm, or combinations thereof (Patent Document 1).

Patent Document 1 teaches a method and a system for actively and automatically providing personal assistance, using a robotic device/platform, based on detected data regarding a user and the user's environment.

PRIOR ART DOCUMENT(S)

Patent Document(s)

Patent Document 1: JP2014-176963A

Patent Document 1 teaches that a robotic personal assistant may be used to provide a reminder to a user, provide assistance for the diagnosis in a medical facility, provide a support for a user suffering from Alzheimer's complications or dementia, assist a parent/caregiver in performing parental control or supervision with respect to a child, and provide a support for a user using a wheelchair. However, Patent Document 1 is silent as to how robotic personal assistants are controlled when the devices are changed as a user grows.

Specifically, while a process of the growth of an infant into an adult and a process of the gradual aging of a person after adulthood are continuous events, personal assistants such as robotic devices are generally replaced at times; that is, drastic changes occur at some points in the process of growth and aging of a person when the person purchases new devices. Patent Document 1 fails to teach what operations a system including such robots should perform at the time of replacement with a new robotic personal assistant, i.e., a drastic change in the robotic personal assistant.

SUMMARY OF THE INVENTION

Task to be Accomplished by the Invention

The present invention has been made in view of the problem of the prior art, and a primary object of the present invention is to provide a personal assistant control system which enables a robot or a personal assistant to properly support a user by serving as a partner of the user, which is more than just a tool, according to the user's growth, even though personal assistants are replaced at times as the user grows.

Means to Accomplish the Task

An aspect of the present invention provides a personal assistant control system comprising: a first personal assistant which is used by a user in a first period and configured to acquire information from a first sensor group, the first sensor group comprising a plurality of sensors; a second personal assistant which is used by the user in a second period and configured to acquire information from a second sensor group, the second sensor group comprising a plurality of sensors; and a server which is connected to the first personal assistant and the second personal assistant via a network, and configured to estimate a state of the user based on information acquired from the first sensor group or the second sensor group, wherein, in a third period that bridges the first period and the second period, the server estimates the state of the user based on information acquired from one or more common sensors which are specific types of sensors included in both the first sensor group and the second sensor group and are configured to acquire at least common attributes.

According to this configuration, in the third period, information acquired by the first personal assistant which the user uses during the first period is linked with information acquired by the second personal assistant which the user uses during the second period, enabling the system to properly estimate a state of the user even when the first personal assistant is replaced with the second personal assistant in the process of the growth (or aging) of the user, so that the personal assistants can properly support the user by serving as a partner of the user as the user grows.

Another aspect of the present invention provides a personal assistant control system comprising: a first personal assistant which is used by a user in a first period and configured to acquire information from a first sensor group, the first sensor group comprising a plurality of sensors; and a server which is connected to the first personal assistant via a network, and configured to estimate a state of the user based on information acquired from the first sensor group, wherein the server is configured such that: in the first period, the server estimates a state of the user based on information acquired from a first attribute detection sensor included in the first sensor group, the first attribute detection sensor being configured to detect at least a first attribute; and in a pre-birth period before the first period, the server estimates a state of the user based on information acquired from a second attribute detection sensor included in the first sensor group, the second attribute detection sensor being configured to detect at least a second attribute that is different from the first attribute.

According to this configuration, when the user is a baby infant during the first period and the user is a fetus in the mother's body during the pre-birth period, for example, the system can commonly use the first personal assistant both in the first period and in the pre-birth period to properly estimate a state of the user either as an baby infant or an fetus, so that the personal assistants can properly support the user by serving as a partner of the user as the user grows over periods including a fetal period.

Yet another aspect of the present invention provides a personal assistant control system comprising: a first personal assistant which is used by a user in a first period and configured to acquire information from a first sensor group, the first sensor group comprising a plurality of sensors; a pre-birth period personal assistant which is used by the user in a pre-birth period before the first period, and configured to acquire information from a second sensor group, the second sensor group comprising a plurality of sensors; and a server which is connected to the first personal assistant and the pre-birth period personal assistant via a network, and configured to estimate a state of the user based on information acquired from the first sensor group or the second sensor group, wherein the server is configured such that: in the first period, the server estimates a state of the user based on information acquired from a first attribute detection sensor included in the first sensor group, the first attribute detection sensor being configured to detect at least a first attribute; and in the pre-birth period, the server estimates a state of the user based on information acquired from a second attribute detection sensor included in the second sensor group, the second attribute detection sensor being configured to detect at least a second attribute that is different from the first attribute.

According to this configuration, when the user is a baby infant during the first period and the user is a fetus in the mother's body during the pre-birth period, for example, the system can use the first personal assistant and the pre-birth period assistant in the first period and the pre-birth period, respectively, to properly estimate a state of the user either as an baby infant or an fetus, so that the personal assistants can properly support the user by serving as a partner of the user as the user grows over periods including a fetal period.

Effect of the Invention

According to the present invention, a personal assistant such as a robot can properly support a user by serving as a partner of the user, which is more than just a tool, according to the user's growth, even though personal assistants are replaced at times as the user grows.

BRIEF DESCRIPTION OF THE DRAWINGS

FIG. 9 is an explanatory diagram showing an outline of a personal assistant control system S1 in a first period T1 and a pre-birth period T0, in accordance with a second embodiment of the present invention;

FIGS. 10A and 10B are explanatory diagrams showing the relationships among the pre-birth period T0, the first period T1, the second period T2, a third period T3, and a fourth period T4, in accordance with the second embodiment of the present invention;

FIG. 12 is an explanatory diagram showing an outline of a personal assistant control system S1 in a first period T1 and a pre-birth period T0, in accordance with a variant of the second embodiment of the present invention.

DESCRIPTION OF THE PREFERRED EMBODIMENT(S)

First Embodiment

Figure 1:
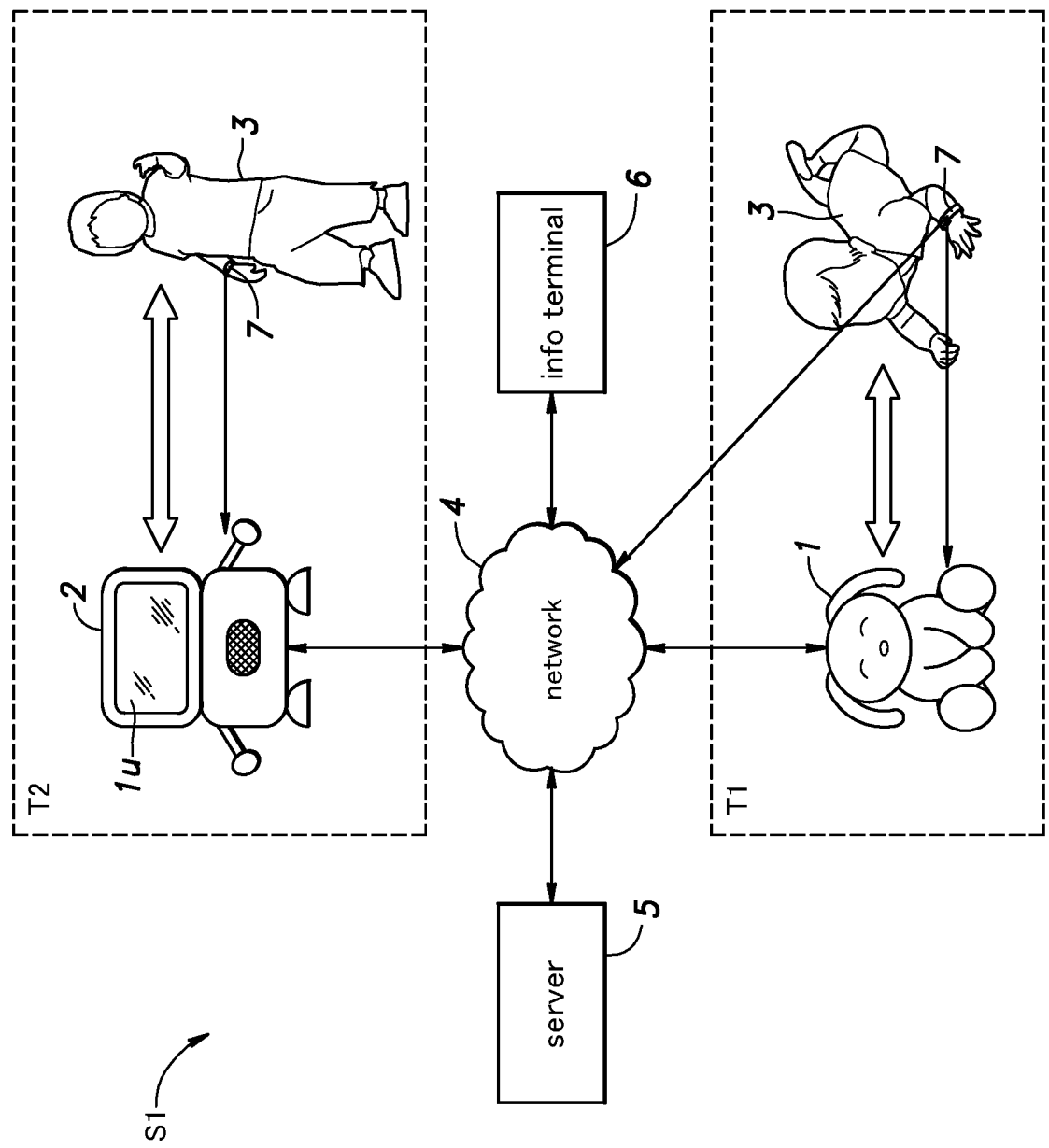
FIG. 1 is an explanatory diagram showing an outline of a personal assistant control system S1 in a first period T1 and a second period T2, in accordance with a first embodiment of the present invention.

Hereinafter, a first embodiment of the present invention will be described with reference to the appended drawings. FIG. 1 is an explanatory diagram showing an outline of a personal assistant control system S1 in a first period T1 and a second period T2, in accordance with the first embodiment of the present invention.

As shown in FIG. 1, a personal assistant control system S1 includes: a first personal assistant (hereinafter, also referred to as "first PA 1"); a second personal assistant (hereinafter, also referred to as "second PA 2", or the first PA 1 and second PA 2 are sometimes referred to collectively as "PA"); a network 4 to which the first PA 1 and the second PA 2 are connected; a server 5 connected to the network 4; and an information terminal 6 connected to the network 4.

Each PA is preferably a robot, for example. The PA may be provided with or without a displacement mechanism such as an arm or a movement mechanism, as long as the PA is configured to be able to interact with a user 3. When the PA includes a moving mechanism, the moving mechanism may be configured to be a bipedal walking mechanism, wheels, or other mechanism, or may be configured to be movable in the air like a drone. The PA is used as a life support device or a life support robot for supporting the life of the user 3 (including cares for the user 3 such as children and the elderly).

In FIG. 1, the first PA 1 is used by the user 3 in the first period T1 and the second PA 2 is used by the same user 3 in the second period T2. In the first embodiment, the system is configured on the assumption that the first period T1 is from a baby infant period of the user 3 (e.g., from the age of zero to one year) to the first half of an infant period of the user 3 (e.g., from the age of one year to two years), and that the second period T2 is the latter half of the infant period of the user 3 (e.g., from the age of three years to the age at the time when the user enters an elementary school).

Considering the development of the user 3 during a period in which each PA is used, the first PA 1 used in the first period T1 has a deformed appearance of a small animal, for example. As a result, the user 3 in the first period T1 can feel familiar and safe with the first PA 1. The second PA 2 used in the second period T2 has a configuration having more functionality so as to be suitable for the user 3 who has grown from the first period T1. Specifically, the second PA 2 includes, for example, a display 1u so as to be capable of providing visual information to the user 3.

It should be noted that, as will be described later, the first period T1 and the second period T2 may partially overlap or may be separated in time. Specifically, although FIG. 1 shows both the first PA 1 and the second PA 2, the personal assistant control system S1 may be configured to include either the first PA 1 or the second PA 2 in each period of the growth process of the user 3.

The first PA 1 acquires various pieces of information from a first sensor group 41 (see FIG. 3) described later, and transmits at least a part of the information to the server 5 via the network 4. The server 5 estimates a state of the user 3 based on received outputs from the first sensor group 41.

Based on the estimated state of the user 3, the server 5 provides a control command to the first PA 1 via the network 4. Upon receiving the control command generated in response to the state in which the user 3 is crying, for example, the first PA 1 outputs a voice or other sound that calms the user 3. Then, the first sensor group 41 acquires the user's reaction or response to the voice or other sound, and then the first PA 1 transmits the information records to the server 5. The user 3 interacts with the first PA 1 in this manner. The server 5 learns what response content can more calm the user 3 depending on the state of the user 3, for example. As a result, when the same state of the user occurs next time, the server 5 can respond more properly based on the learning result.

The second PA 2 acquires various pieces of information from a second sensor group 42 (see FIG. 4) described later, and transmits at least a part of the information to the server 5 via the network 4. The server 5 estimates a state of the user 3 based on received outputs of the second sensor group 42. When the user 3 grows up and reaches the second period T2, the learning result acquired in the first period T1 is inherited and used by the second PA 2 to interact with the user 3. In the second period T2, the linguistic ability of the user 3 has been significantly increased. Thus, in this period, the second PA 2 and the user 3 perform interactions (two-way communications) with each other mainly through the language.

In FIG. 1, the information terminal 6 may be a smartphone, a tablet, a smart watch, a personal computer, or any other suitable device. The information terminal 6 is owned by a second person 15 such as the mother of the user 3. The server 5 estimates information about a state of the user 3 and an environment around the user 3 based on information records acquired from the first PA 1 or the second PA 2, and transmits the estimated information to the information terminal 6. As a result, the second person 15, the owner of the information terminal 6, can grasp the state of the user 3 and the surrounding environment even if the second person 15 is away from the user 3. Then, the second person 15 provides voice input to the information terminal 6, for example, so that the voice can be reproduced by the PA.

FIG. 1 shows a vital sensor 7 having a wristband shape, for example, and worn on the wrist or any other part of the body of the user 3.

FIGS. 2A to 2D are explanatory diagrams showing the relationships among the first period T1, the second period T2, a third period T3, and a fourth period T4, in accordance with the first embodiment of the present invention. As described above, in the first embodiment, the system is configured on the assumption that the first period T1 is from a baby infant period of the user 3 to the first half of an infant period of the user 3, and that the second period T2 is the latter half of the infant period of the user 3. Accordingly, the first period T1 includes a period before the second period T2.

As shown in FIGS. 2A to 2D, the first period T1 and the fourth period T4 start after a predetermined time has elapsed from the birth of the user 3. Of course, the first period T1 and the fourth period T4 may start at the time when the user 3 is born. The start of the first period T1 and the fourth period T4 may vary depending on the time when a second person 15 (a parent or guardian of the user 3) starts using the first PA (i.e., when the second person 15 purchases the first PA and puts it into use).

Figure 2A:
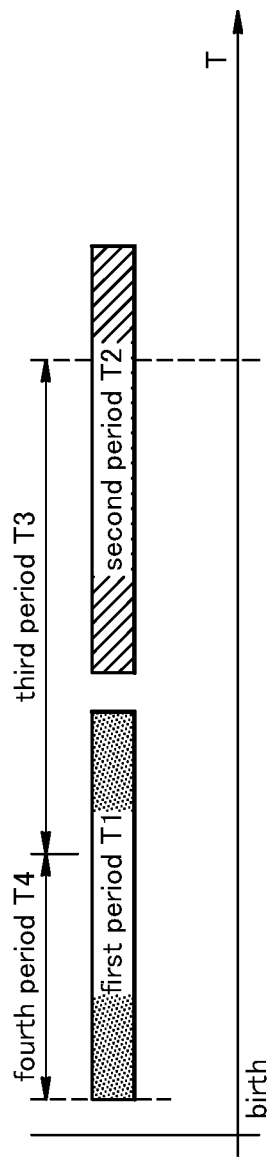
FIGS. 2A to 2D are explanatory diagrams showing the relationships among the first period T1, the second period T2, a third period T3, and a fourth period T4, in accordance with the first embodiment of the present invention.

As shown in FIG. 2A, the first period T1 and the second period T2 may be separated in time along the time axis T. In this case, the use of the second PA 2 starts after a while from when the use of the first PA 1 ended.

Figure 2B:
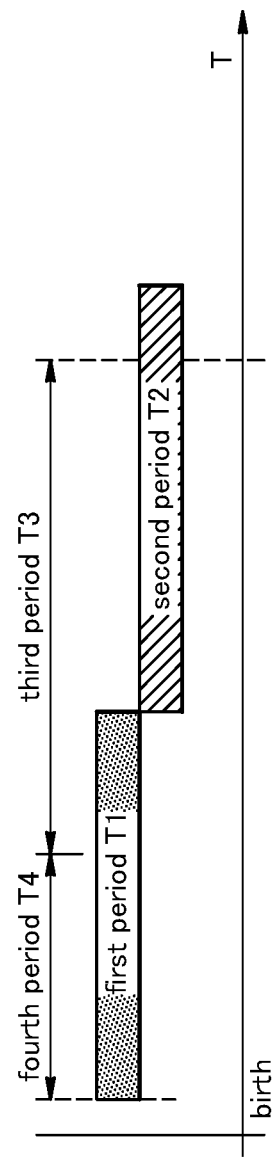

As shown in FIG. 2B, the first period T1 may end at the start of the second period T2. In this case, the use of the first PA 1 ends when the second PA 2 is purchased.

Figure 2C:
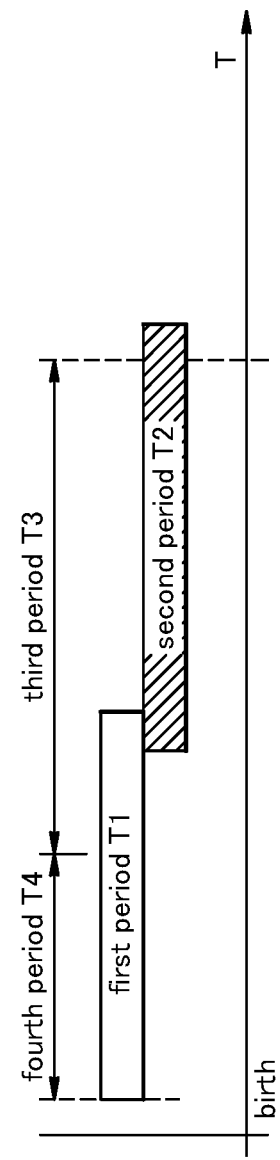
Figure 2D:
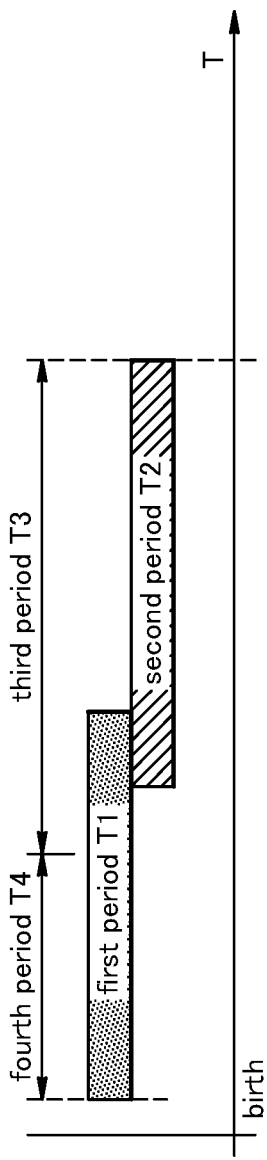

As shown in FIGS. 2C and 2D, the latter half of the first period T1 and the first half of the second period T2 may partially overlap. In this case, in the overlapped period, the first PA 1 and the second PA 2 are used simultaneously.

The third period T3 refers to a period that bridges the first period T1 and the second period T2. As shown in FIG. 2A, the first period T1 and the second period T2 may be separated in time within the third period T3. As shown in FIG. 2B, the first period T1 may end at the start of the second period T2 within the third period T3. Or as shown in FIGS. 2C and 2D, the latter half of the first period T1 and the first half of the second period T2 may partially overlap within the third period T3. In addition, as shown in FIG. 2D, the third period T3 may end at the end of the second period T2.

As shown in FIGS. 2A to 2D, the fourth period T4 refers to a part of the first period T1 that is not included in the third period T3. Accordingly, the fourth period T4 is a period before the third period T3. As will be described in detail later, in the first embodiment, the server 5 uses a different set (combination) of sensors to estimate a state of the user 3 for each of the first period T1, the second period T2, the third period T3, and the fourth period T4.

Figure 3:
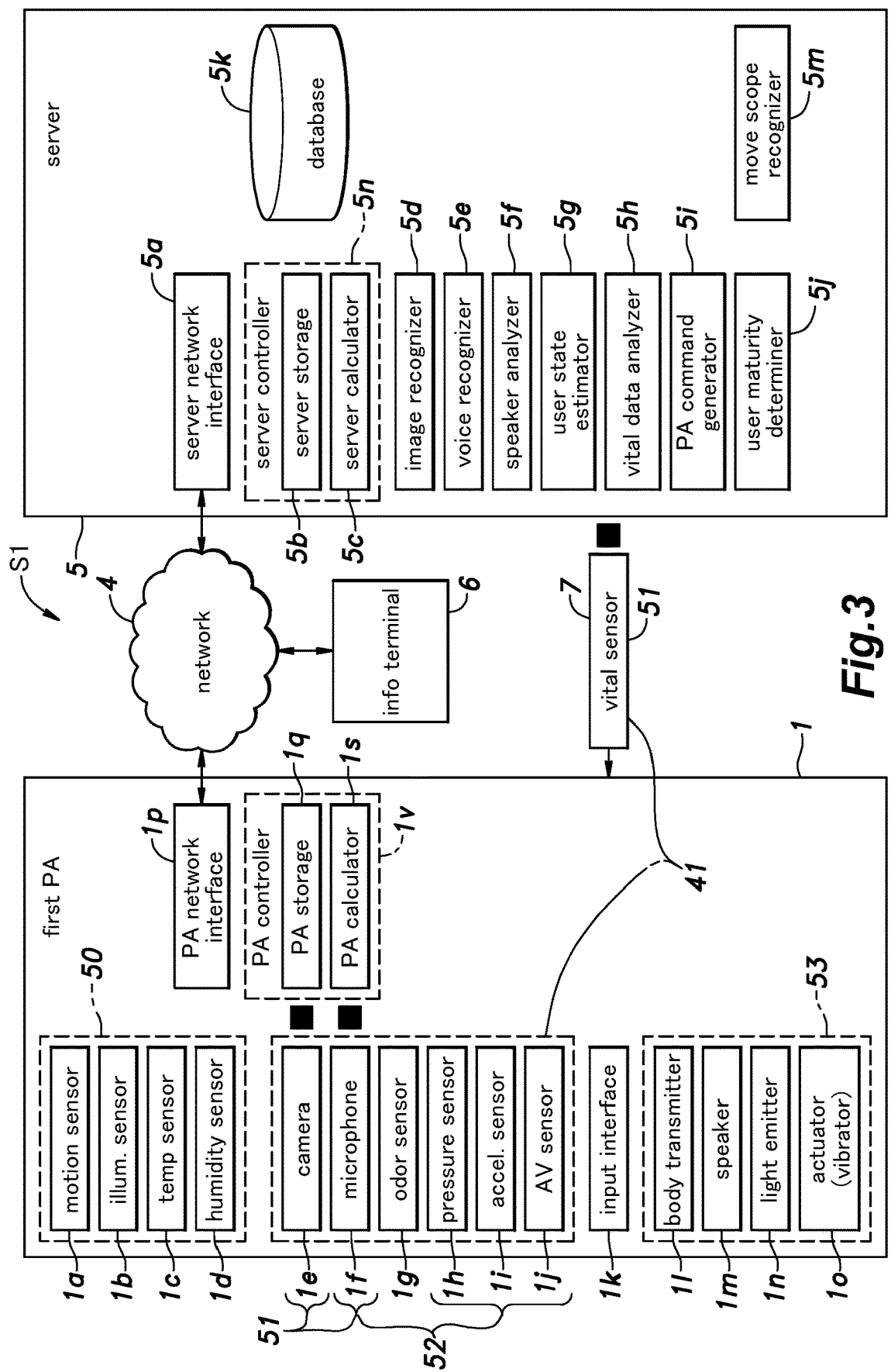
FIG. 3 is a block diagram showing a configuration of the personal assistant control system S1 in the first period T1 in accordance with the first embodiment of the present invention.

FIG. 3 is a block diagram showing a configuration of the personal assistant control system S1 in the first period T1 in accordance with the first embodiment of the present invention. The personal assistant control system S1 includes at least the first PA 1 and the server 5. The first PA 1 and the server 5 are connected to each other via the network 4. The personal assistant control system S1 may further include the information terminal 6 and a vital sensor 7.

The first PA 1 will be described. The first PA 1 includes an environment sensor 50, a first sensor group 41, an output interface 53, an input interface 1k, a PA network interface 1p, and a PA controller 1v. The PA network interface 1p connects the first PA 1 to the network 4 and used to transmit/receive information to/from the server 5.

Each of these components and various sensors constituting the first sensor group 41 described later are connected by bus lines (not shown). Alternatively, a conversion module for A/D conversion of an output of a sensor (analog signals, in this case) may be connected by a bus line (not shown). The PA controller 1v includes a PA storage 1q and a PA calculator 1s. The PA storage 1q is comprised primarily of a ROM (Read Only Memory), a RAM (Random access memory), or any other type of memory, for example. The PA calculator 1s is comprised primarily of a CPU (Central Processing Unit), for example. The PA calculator is controls the PA network interface 1p to transmit information recodes acquired from the first sensor group 41 to the server 5 according to programs stored in the PA storage 1q. Furthermore, the PA calculator 1s controls the output interface 53 based on a command or any other instruction signal transmitted from the server 5.

The PA storage 1q stores code information for identifying the first PA 1, a user ID, and personal information of the user 3 such as date of birth, name, and nickname. A second person 15 such as a parent of the user 3 can operate the information terminal 6 to enter the personal information of the user 3, which is then transmitted from the information terminal 6 to the first PA 1 via the network 4. When receiving the personal information, the first PA 1 stores the received information in the PA storage 1q and transmits it to the server 5 together with the code information previously stored in the PA storage 1q. Upon receiving these pieces of information, the server 5 issues a user ID as a unique identifier, associates the code information of the first PA 1 transmitted from the information terminal 6 with the user ID and the personal information, and stores the set of associated information in the database 5k. Then, the server 5 transmits the generated user ID to the first PA 1. The first PA 1 stores the received user ID in the PA storage 1q. This user ID can be used as a search key for searching the database 5k of the server 5, for example.

Next, the environment sensor 50 will be described. The first PA 1 is provided with the environment sensor 50 including a motion sensor 1a, an illuminance sensor 1b, a temperature sensor 1c, and a humidity sensor 1d. The environment sensor 50 measures information about the environment around the user 3. The motion sensor 1a includes a pyroelectric sensor, an image sensor, and any other suitable component. The illuminance sensor 1b includes a phototransistor with a built-in optical filter or any other suitable component. The temperature sensor 1c includes a resistance temperature detector or any other suitable component. The humidity sensor 1d detects changes in resistance and capacitance caused by changes in humidity.

The motion sensor 1a is preferably what is called an image-type sensor that can detect the positions and number of persons. The motion sensor 1a detects that the user 3 (see FIG. 1) or the second person 15 (or another person other than the user 3 or second person 15) is present near the first PA 1. In the first embodiment, the motion sensor 1a is built in the first PA 1. When the motion sensor 1a is an image-type sensor, the motion sensor 1a may be a separate component from the first PA 1, and configured to be provided on the ceiling so that results of measuring the positions and number of persons are wirelessly transmitted to the first PA 1. The illuminance sensor 1b detects the illuminance of the environment in which the first PA 1 is placed (usually, it is also the environment around the user 3). The temperature sensor 1c detects the temperature of the environment in which the first PA 1 is placed. The humidity sensor 1d detects the humidity of the environment in which the first PA 1 is placed. Outputs of the sensors included in the environment sensor 50 are transmitted to the server 5.

Next, the first sensor group 41 will be described. Among the first sensor group 41, a camera 1e, a microphone 1f, an odor sensor 1g, a pressure sensor 1h, an acceleration sensor 1i, an angular velocity sensor 1j, the vital sensor 7 are sensors used to detect a state of the user 3. The camera 1e is comprised primarily of an image sensor or any other suitable sensor. The microphone 1f is a sensor used to acquire sound.

In the first period T1, the first PA 1 is usually placed near a baby crib in which the user 3 is present. In the present embodiment, the camera 1e mainly captures images of the user 3 as a subject. The camera 1e captures a moving image or a still image. Images captured by the camera 1e are transmitted to the server 5. When a captured image is a still image, the timing at which the camera 1e captures images can be freely set. For example, the camera 1e may periodically pick up images. The camera 1e may be configured to pick up an image when the microphone 1f detects a sound with a sound pressure exceeding a predetermined level (for example, in the case that the user 3 starts crying). In other cases, the camera 1e may be configured to pick up an image when the smiling of the user 3 is detected based on the output of the camera 1e. Moreover, the PA controller 1v may detect the position of the user 3 based on the acquired images. The first PA 1 may be provided with an actuator 1o for providing the camera 1e with a pan-tilt function, or a mechanism for rotating at least the first PA 1 within a plane. The PA controller 1v may trace the positions of the user 3 based on the captured images and control the actuator 1o so that the user 3 is within the imaging area of the camera 1e.

The microphone 1f mainly acquires voice issued by the user 3. The sound information acquired by the microphone 1f may be periodically transmitted to the server 5 in digital form. The camera 1e may be configured to pick up an image when the microphone 1f detects a sound with a sound pressure exceeding a predetermined level (for example, when the user 3 starts crying). Alternatively, the first PA 1 may transmit the sound information to the server 5 only when determining that a sound pressure of the voice or sound acquired by the PA controller 1v exceeds a predetermined level. Moreover, when the PA controller 1v has a frequency analysis function, the first PA 1 may be configured to transmit sound information records with predetermined frequencies to the server 5.

The odor sensor 1g is, for example, a sensor utilizing the phenomenon in which absorption of a specific odor molecule onto the surface of a metal oxide semiconductor lowers the resistance of the semiconductor. The odor sensor 1g is often used as the environment sensor 50. However, as described above, since the first period T1 includes the baby infant period of the user 3 in the present embodiment, the odor sensor 1g, which detects the baby's urination or defecation, can be used as one of the sensors for detecting a state of the user 3. The PA controller 1v may directly transmit outputs of the odor sensor 1g to the server 5. Alternatively, the PA controller 1v may be configured to determine that the user 3 has urinated or defecated when the output signal of the odor sensor becomes greater than a predetermined level, and transmit to the determination result to the server 5.

The pressure sensor 1h detects a pressure by detecting deformation of a semiconductor strain gauge formed on the surface of a diaphragm, for example. The pressure sensor 1h detects a situation in which the user 3 holds the first PA 1 in his arm or clutches it to the user's chest. Alternatively, the pressure sensor 1h detects how the user 3 handles the first PA 1 (that is, whether the user handles it carefully or roughly), thereby detecting the user's direct action on the first PA 1. For example, when the output signal of the pressure sensor 1h exceeds a predetermined level, the PA controller 1v transmits the output level to the server 5. In view of the fact that the pressure sensor 1h is used to measure a pressure caused by the user's direct action on the first PA, the first PA 1 may be provided with a plurality of pressure sensors 1h.

The acceleration sensor 1i detects changes in the capacitance using MEMS technologies (three axes), for example. The angular velocity sensor 1j detects, for example, the Coriolis force (three axes). The acceleration sensor 1i and the angular velocity sensor 1j detect the user's direct action on the first PA 1 in a similar manner to the pressure sensor 1h.

The vital sensor 7 is in the form of a wristband, for example (see FIG. 1). The vital sensor 7 is provided with, for example, a near-infrared light receiving/emitting element, and is attached to the wrist or any other part of the user 3's body to measure the user's pulse. Of course, the vital sensor 7 may measure not only the pulse but also the body temperature of the wristband wearing portion of the user 3's body. Moreover, when the vital sensor 7 is configured to be capable of measuring acceleration and angular velocity, the sensor is used to measure the acceleration and angular velocity. With regard to the measurement of the user's pulse, the above-mentioned camera 1e may capture face images of the user 3 as a moving image, and the first PA may be configured to measure the pulse of the user 3 based on the captured moving image (in particular, the output of the G channel).

In the first embodiment, all sensors but the vital sensor 7 included in the first sensor group 41 are built in the first PA 1. The vital sensor 7 that is located outside the first PA 1 is connected to the first PA 1 by wireless communications such as BLE wireless communications. Pulse measurements provided by the vital sensor 7 are transmitted to the server 5 via the first PA 1. Since the information acquired by the first sensor group 41 is used for input data to a learning model described later, synchronization is achieved when information records from the first sensor group 41 are acquired. Of course, the trigger of synchronization is not limited, and information records from the first sensor group may be acquired periodically. In another cases, when the first PA 1 detects the output of the microphone 1f that is greater than a predetermined level, the detection may be used as a trigger for acquiring information records.

Next, the input interface 1k will be described. The input interface 1k is provided, for example, at a predetermined position of the first PA 1, and detects an external touch or pressing pressure. The second person 15 who is in close contact with the user 3 (infant, in this case) determines a state of the user 3, and uses the input interface 1k to enter the state of the user 3 such as "calm" or "irritated" (corresponding to a "mood index" described later). The input interface 1k may be a plurality of pressing switches, each for a corresponding one of the various states of the user 3. In some cases, the input interface 1k may be configured such that the second person 15 chooses one of the listed items and then determine that choice.

Next, the output interface 53 (first user interface) will be described. A body transmitter 11 is, for example, a film-like member provided on a part of the surface of the first PA 1 and made of flexible material such as polypropylene (PP). Fr example, assuming that the user 3 is an infant in the first half of the infant period, when the user 3 holds the first PA 1 in the user's chest, the body transmitter 11 provides a relatively low frequency vibration imitating the heartbeat of the mother to the user, thereby bringing the user 3 in a more relaxed state.

The output interface 53 includes at least one selected from the group consisting of a speaker 1m for outputting voice and any other sound, a light emitter 1n, and an actuator 1o (e.g., a vibrator). The light emitter 1n is provided at an easily visible location on the first PA 1, and includes an LED (Light Emitting Diode) or an OLED (Organic Light Emitting Diode), for example. The actuator 1o allows the first PA 1 to perform a predetermined mechanical operation. These elements are driven based on information and instructions transmitted from the server 5 via the network 4.

Next, the server 5 will be described. The server 5 includes a server network interface 5a and a server controller 5n. The server network interface 5a is used to input/output information records to/from the first PA 1 and the information terminal 6 via the network 4. The server controller 5n includes a server storage 5b and a server calculator 5c. The server storage 5b is comprised primarily of a ROM, a RAM, or any other suitable memory, for example. The server calculator 5c is comprised primarily of a CPU, for example. The server calculator 5c controls other components of the server 5 based on programs stored in the server storage 5b.

Furthermore, the server 5 includes an image recognizer 5d, a voice recognizer 5e, a speaker analyzer 5f, a user state estimator 5g, a vital data analyzer 5h, a PA command generator 5i, a user maturity determiner 5j, a database 5k, and a movement scope recognizer 5m for recognizing the user's movement area.

The image recognizer 5d extracts a face region of the user 3 from the image information transmitted from the first PA 1 and extracts a predetermined feature amount. The voice recognizer 5e extracts "phonemes" from the sound information transmitted from the first PA 1, converts them into text, and then specifies the lexical information. The speaker analyzer 5f performs, for example, frequency analysis on the sound information to distinguish a speaker at least between the user 3 and the second person 15 (which may be a person other than the mother). The vital data analyzer 5h estimates a physical condition or any other condition of the user 3 based on the pulse information records of the user 3 transmitted from the first PA 1. The PA command generator 5i generates and transmits a predetermined command or other instructions for the first PA 1 based on the instruction from the server controller 5n. The user maturity determiner 5j determines, in particular, the number of vocabulary words, the difficulty levels of vocabulary words, and the degree of recognition certainty recognized by the voice recognizer 5e. The database 5k is configured by using large-capacity storage.

As described above, the database 5k stores the user ID and the personal information of the user 3 transmitted from the first PA 1 to the server 5. Furthermore, the database 5k stores a learning model which has been trained as appropriate. The user state estimator 5g uses the information records acquired from the first sensor group 41 as input data to the learning model (as described below, the information records are partially converted into feature amount data and then used as input data to the model). A predetermined index (mood index) is derived as the output of the learning model. In this case, examples of suitable learning models include SVM (Support Vector Machine), which is a pattern recognition model. Of course, a plurality of learning models may be used, each trained for a corresponding mood index by using a deep learning method.

Examples of information records used as input data to the learning models include: feature amount data generated by the image recognizer 5d based on camera images acquired by the camera 1e (Still images are desirable, and in the case of video image, still images are captured from the video); voice data including voice tone data based on sound information acquired by the microphone 1f and vocabulary information generated by the voice recognizer 5e; odor data acquired by the odor sensor 1g (In particular, odors related to urination and defecation); and information records acquired by the pressure sensor 1h, the acceleration sensor 1i, and the angular velocity sensor 1j when the user 3's direct action is made on the first PA 1. Of course, the output of the vital data analyzer 5h may be used as input data to the learning model together with these information records.

A "mood index" as used herein refers to an index indicating a state of the user 3. The mood indexes can include states that are likely to appear in facial expressions such as "laughing", "angry", and "crying", "calm", "irritated", "excited", and "excited", and inner states such as "resting" and "concentrating." The user state estimator 5g uses a learning model to derive mood indexes for multiple aspects of emotional states such as "crying" and "excited." The user state estimator 5g estimates a state of the user 3 based on the combination of the mood indexes. As described above, in the first embodiment, the learning model outputs a plurality of mood indexes in response to a group of inputs. Of course, a single mood index may be output in response to input data.

Since the mood index is also affected by the environment around the user 3, the information acquired by the environment sensor 50 may be used in building (training) a learning model. In this case, input data to the trained learning model also includes information records acquired from the environment sensor 50. Similarly, since the mood index is also affected by the physical or body states related to physical and mental health conditions of the user 3, input data may additionally include a value derived from the pulse data of the user acquired by the vital sensor 7 or generated from images captured by the camera 1e. In this case, the server 5 may measure the stress level of the user 3 based on the measurement result of the pulse acquired from the vital sensor 7, and use the measured stress level as an input to the user state estimator 5g.

The user state estimator 5g transmits a derived mood index to the server controller 5n. Upon receiving the mood index, the server controller 5n instructs the PA command generator 5i to extract a certain response from the responses learned in the past or originally stored. For example, in a state where the user 3 is "excited" and "crying", the server controller 5n instructs the PA command generator 5i to extract, as a response, music or voice (such as mother's voice) which has been proven to change the state of the user from "crying" to "calm." Thus, the PA command generator 5i searches the database 5k, selects content data that is presumed to be appropriate, and provides an audio reproduction command to the first PA 1. Of course, in cases where there is some correlation (i.e., an effect of making the user 3 relaxed, for example) between the mood index and a light emission pattern of the light emitter 1n of the first PA 1 or between the mood index and an operation pattern of the first PA 1 by driving the actuator 1o (vibrator), the PA command generator 5i may output not only voice but also a reproduction command regarding the light emission pattern of the light emitter 1n or the operation pattern (vibration pattern) of the first PA 1.

In this way, an interaction occurs between the first PA 1 and the user 3 by using a mood index derived based on outputs of the first sensor group 41. For example, when the number of pulses (i.e., heart rate) acquired by the vital sensor 7 during a predetermined period of time is greater than usual, and/or the act of the user 3 including hitting or throwing the first PA 1 is detected (which can cause a great change in the outputs of the pressure sensor 1h, the acceleration sensor 1i and the angular velocity sensor 1j), the user state estimator 5g determines that the user 3 is "irritated". Then, the server controller 5n determines that, among a plurality of response candidates, the most effective response is to reproduce, for example, the mother's words "diddums, it's OK now", and instructs the PA command generator 5i to transmit a command for reproduction of the content to the first PA 1. In response to the instructions, the PA command generator 5i transmits a predetermined command and content data to the first PA 1.

As a result, the sound, light emission, or motion pattern reproduced by the first PA 1 causes a new change in the emotion and behavior of the user 3. The change in the emotion and behavior is detected by the first sensor group 41 and transmitted to the server 5, where a new mood index is generated. For example, when there is no improvement in the mood index of "irritated", the server controller 5n selects another response among the possibly effective content candidates and instructs the PA command generator 5i to transmit a command for the use of the newly selected content to the first PA 1, and the interaction between the user 3 and the first PA 1 is continued. Then, through the interaction, the server controller 5n modifies the priorities given to the contents to be used in response to the mood index. This response content is stored in the database 5k, and the relationship between the mood index and the response content is learned by the server.

In this way, in the first embodiment, the server 5 estimates a state (mood index) of the user 3 based on information acquired from the first sensor group 41 in the first period T1 (a period before the second period T2 as described above). Furthermore, the server 5 responds to the user 3 via the first user interface (e.g., the speaker 1m included in the output interface 53 in this case) provided in the first PA 1 based on the estimated state of the user 3, and learns the response content in association with the state (mood index) of the user 3. Moreover, as will be described later, in the second period T2, the server 5 estimates a state of the user 3 based on information acquired from the second sensor group 42 provided in the second PA 2.

Furthermore, the server 5 refers to the response content learned in the first period T1 based on the estimated state of the user 3, and responds to the user 3 via a second user interface (speaker 1m or a display 1u, for example (see FIG. 4)) provided in the second PA 2.

Importantly, although the first sensor group 41 used to acquire information in the first period T1 include different types of sensors from those of the second sensor group 42 used to acquire information in the second period T2, the user state estimator 5g generates a state of the user 3 as a common mood index even when input data includes information records acquired from different types of sensors. By using such common mood indexes, a response content learned during the user 3's baby period can be utilized even when the user 3 grows up to be a child.

The server 5 can also learns a content to be used as a response in direct association with outputs of the first sensor group 41. However, this scheme results in a greater degree of blackboxing of a learning model. Using a common "mood index", which links outputs of the first sensor group 41 to a content to be output and does not depend on the age of the user 3, minimizes the degree of blackboxing of a learning model and allows a proper support, regardless of the age of the user 3.

When there is a discrepancy between input data to the input interface 1k of the first PA 1 (the input data is the second person 15's subjective judgement about the state of the user 3) and a mood index estimated by the user state estimator 5g, the above-described learning model can be retrained or additionally trained to minimize the degree of the discrepancy.

Each image information record captured by the camera 1e is stored (archived) in the database 5k together with the imaging date, the imaging time, and the mood index. Of course, each image information record may be stored in the database 5k in association with information records acquired by other sensors of the first sensor group 41 at the time of imaging.

Each sound information record recorded by the microphone 1f may be stored in the database 5k together with the recording date, the recording time, and the mood index. Of course, each sound information record may be stored in the database 5k in association with information records acquired by other sensors of the first sensor group 41 at the time of recording sound. For example, when an abnormal sound is detected, the sound information may be stored in the database 5k in association with image information records of the past several tens of seconds from the time of detection.

The accumulated image information records and sound information records can be reproduced later when the user 3 or a second person 15 provides a voice instruction or any other type of instruction to the first PA 1 or the information terminal 6. For example, the user 3, after reaching adulthood, can make a voice request such as "I want to see my smiling face picture when I was at the age of three." The voice recognizer 5e of the server 5 interprets the request, and the server controller 5n searches the database 5k by using the age and the mood index as search keys, and transmits, for example, the information requested by the user 3 to the information terminal 6.

For example, the server controller 5n detects an interaction between the second person 15 (mother, in this case) and the user 3 based on a measurement result of the environment sensor 50 (motion sensor 1a) of the first PA 1 and an analysis result of the speaker analyzer 5f. When the second person speaks to the user 3, the voice of the second person 15 is stored in the database 5k as sound information, and is extracted as vocabulary words by the voice recognizer 5e. Also, the server acquires a mood index of the user 3. Then, the state of this interaction is also accumulated in the database 5k, whereby the action of the second person 15 (speaking to the user) is learned in association with the state (mood index) of the user 3 based on the information acquired by the first sensor group 41.

As a result of this learning, for example, the more frequently the mood index of the user 3 changes from "excited" to "calming" or "laughing" in response to the mother's saying "honey, you're so cute", the more likely the first PA 1 reproduces the mother's voice "honey, you're so cute" extracted from the sound information stored in the database 5k, in response to the state in which the mood index of user 3 becomes "excited." This operation is particularly effective in the case that the user 3 starts crying while the second person 15 is not present near the user 3, for example.

As described above, in the first embodiment, the server 5 extracts an action (e.g., speaking) of the second person 15 to the user 3 based on information acquired from the first sensor group 41 in the first period T1. Furthermore, the server 5 learns the action of the second person 15 in association with a state (mood index) of the user 3 derived based on information acquired by the first sensor group 41. As will be described later, in the second period T2, the server 5 instructs the second PA 2 to reproduce at least a part of an action of the second person 15 learned in the first period T1, based on a state of the user 3 estimated from information acquired by the second sensor group 42.

Interactions between the second person 15 and the user 3 are not limited to direct interactions as described above. In the first embodiment, the first PA 1 transmits environment information acquired by the environment sensor 50, image information captured by the camera 1e, sound information recorded by the microphone 1f, and other information to the server 5 via the network 4. The server 5 can transmit these pieces of information to the information terminal 6 owned by the second person 15. The server 5 may transmit a mood index as described above to the information terminal 6 together with the pieces of information. Furthermore, the server 5 also can receive sound information recorded by a second microphone (not shown) in the information terminal 6, and transmits a voice reproduction instruction to the first PA 1 from the PA command generator 5i.

For example, when the second person 15 recognizes that the user 3 is crying through image information and sound information received by the information terminal 6, the second person 15 can indirectly speak to the user 3 using the second microphone (not shown) of the information terminal 6. When the second person 15 determines that the room temperature or the room humidity is too high or that the room is too bright, the second person 15 can operate the information terminal 6 to make the environment around the user 3 more comfortable. Such actions of the second person 15 for the user 3 are also measured by the environment sensor 50 and the first sensor group 41, and used by the server 5 to derive a mood index. Then, each action of the second person 15 in association with a corresponding mood index is used in learning (i.e., training the model). Moreover, in response to a certain state of the user 3, the server 5 may provide advice to the second person 15 such as outputting the voice stating "if you dim the room light a little, the baby will calm down" via the information terminal 6, for example. In other cases, when the server has a function of adjusting the light of the room, the server 5 may control the light to dim the lighting of the room in response to a certain state.

As described above, the first period T1 is from a baby infant period of the user 3 (e.g., from the age of zero to one year) to the first half of an infant period of the user 3 (e.g., from the age of one year to two years). In the first period T1, the growth (in particular, language development) of a user 3 is generally significant. After two months of age, a baby begins to coo; that is, produce a sound such as "ah" and "uh." As interactions with a second person 15 are repeated, the baby gradually starts to react in voice to "sound the baby hears." After four months of age, the baby begins to babble including consonants along with vowels, such as "maa" and "daa." After eight months of age, the baby becomes able to clearly utter various consonants and begin to imitate words produced by the mother or others. According to articles published from the Ministry of Health, Labor and Welfare, about 95% of infants can speak meaningful words on their own initiative by the time they are 20 months old. It is also known that there are large individual differences in language development from infants to young children.

As a baby or infant grows up in the first period T1, the number of vocabulary words recognizable by the voice recognizer 5e increases, and the difficulty levels of vocabulary words also increase. In addition, as a baby or infant grows up, the pronunciation becomes clearer, which improves the rate of voice recognition through the voice recognizer 5e.

The user maturity determiner 5j provided in the server 5 determines the maturity level of the user 3 based on at least one of the number of vocabulary words, the difficulty levels of vocabulary words, and the degree of recognition certainty recognized by the voice recognizer 5e. Specifically, the user maturity determiner 5j evaluates the language ability of the user 3 based on corpus data and other data, and outputs the evaluation result as a maturity index. When the maturity index becomes greater than a predetermined value, the server controller 5n determines that the user 3 has reached a stage where the user 3 is sufficiently capable of more advanced interactions. Under this condition, the server 5 notifies the user 3 or the second person 15 that there is no longer a need for the first PA 1, and proposes replacement with (i.e., new purchase of) a second personal assistant (second PA 2 described later) through the first PA 1 or the information terminal 6, for example, where the second PA 2 is configured to perform more advanced interactions with the user 3, e.g., by providing information via texts or images. The user maturity determiner 5j may determine the maturity level of the user 3 based on the mood indexes output by the user state estimator 5g, e.g., by detecting a decrease in the rate of change in mood in a day. In some cases, the user maturity determiner 5j may determine the maturity level of the user 3 in response to the fact that the movement scope of the user 3 estimated by the movement scope recognizer 5m is expanded beyond a predetermined reference scope. In other cases, the user maturity determiner 5j may determine the maturity level of the user 3 based on the information of the date of birth included in the user personal information stored in the PA storage 1q.

Figure 4:
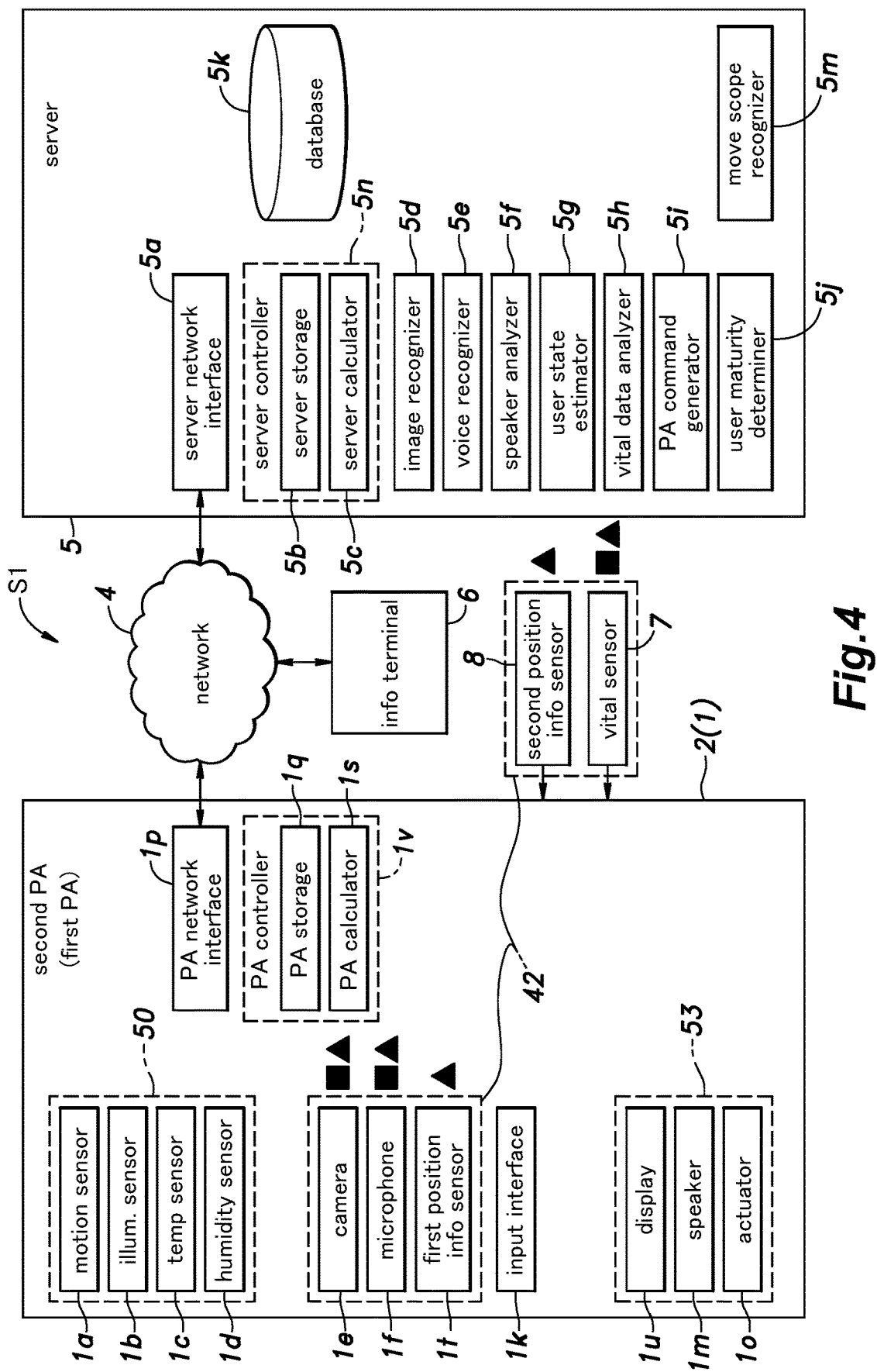
FIG. 4 is a block diagram showing a configuration of the personal assistant control system S1 in the second period T2 in accordance with the first embodiment of the present invention.

FIG. 4 is a block diagram showing a configuration of the personal assistant control system S1 in the second period T2 in accordance with the first embodiment of the present invention. In FIG. 4, the server 5 is equivalent to that described with reference to FIG. 3, and thus the parts of the server corresponding to those in FIG. 3 are denoted with like reference numerals without repeating the description of such parts. The parts of the second PA 2 corresponding to those in FIG. 3 are also denoted with like reference numerals without repeating the description of such parts.

The second PA 2 used for the second period T2 will be described with reference to FIG. 4 in combination with FIG. 3. As shown in the figures, the second PA 2 includes a second sensor group 42. Compared to the first sensor group 41 described above, the second sensor group 42 lacks the odor sensor 1g, the pressure sensor 1h, the acceleration sensor 1i, and the angular velocity sensor 1j in the first sensor group, but additionally includes a first position information sensor 1t and a second position information sensor 8.

With regard to the output interface 53, compared to the first PA 1, the output interface 53 lacks the body transmitter 11 and the light emitter 1n in the first PA 1, but additionally includes a display 1u. Thus, the output interface 53 (second user interface) of the second PA 2 includes at least one of the speaker 1m, the display 1u, and the actuator 1o.

As described above, the second period T2 is the latter half of the infant period of the user 3 (e.g., from the age of three years to the age at the time when the user enters an elementary school). In general, babies "grow out of diapers during the daytime" by about one and a half to two years old. Thus, the second PA 2 used in the second period T2 is not provided with the odor sensor 1g for detecting urination or defecation on a daily basis. In addition, in the second period T2, the user 3 can express the user's emotions in words, and a rational aspect appears in the user 3's behavior. Thus, mood indexes derived based on the user 3's facial expressions and vocabulary words are more appropriate than those derived based on the user 3's direct actions to the second PA 2, where the facial expressions are extracted from image information acquired by the camera 1e and the vocabulary words are recognized by the voice recognizer 5e from the sound information acquired by the microphone 1f. Of course, bases for deriving mood indexes may further include outputs from the environment sensor 50 and the vital sensor 7, which can affect the mood index.

The first position information sensor 1t included in the second sensor group 42 is a sensor for measuring the position of the second PA 2 located indoors. The first position information sensor 1t measures the position of the second PA 2 by using a suitable positioning method such as a WiFi positioning in which three-point positioning is performed based on the differences in the radio field strength and the arrival time of signals from multiple WiFi access points, or a beacon positioning in which three-point positioning is performed based on the radio field strength of BLE beacon signals according to BLE (Bluetooth (registered trademark) Low Energy) standard.

The second position information sensor 8 is a sensor for measuring the position of the user 3 located indoors. The second position information sensor 8 is provided with the same sensing means as the first position information sensor 1t, for example. In this case, the user 3 needs to carry a device such as a BLE beacon transmitter. Of course, the first position information sensor 1t and the second position information sensor 8 may be positioning sensors using GPS (Global Positioning System). In addition, the positions may be measured by utilizing a positioning technique such as IMES (Indoor MEssaging System). Furthermore, image information provided from the camera 1e may be used to measure the relative position of the user 3 with respect to the position of the second PA 2 located indoors, and this relative position may be used as the position data of the user 3. In this case, the camera 1e is desirably a so-called stereo camera, which can acquire depth information.

In the second period T2, the user 3 can freely move indoors, and, for example, the moving speed and the movement scope may also affect the mood index. Specifically, when the user is calm, the moving speed is relatively slow, while when the user is irritated, the moving speed is generally high. The separation distance between the second PA 2 and the user 3 can be one of the parameters indicating the relationship between the two. In particular, in the case where the second PA 2 can move by using the actuator 1o, the system may be configured to acquire the positional relationship between the second PA 2 and the user 3 so that the second PA 2 can move closer to or move away from the user 3 based on the mood index.

In the second period T2, the second PA 2 transmits information acquired by the second sensor group 42 to the server 5 via the network 4. In the server 5, the user state estimator 5g outputs a mood index. The server controller 5n estimates the state of the user 3 based on the mood index, and causes the PA command generator 5i to select the operation to be performed by the second PA 2. Then, the PA command generator 5i generates a command for the selected operation. This command may also include a command to move the position of the second PA 2 as described above.

The second PA 2 is provided with a display 1u, which the first PA 1 does not include. The display 1u displays text or image (still image, moving image) content thereon. When determining that the second PA 2 is provided with the display 1u based on code information from the second PA 2 (ID code for the PA as described above), the server 5 transmits an image content to the second PA 2 in place of or together with a sound content.

In the second period T2, since the user 3 has significantly improved image recognition ability as well as language ability, providing images contents to the user 3 becomes very important. For example, determining that a certain mood index (e.g., "concentrated") is generated more often when an image of a vehicle is displayed to the user 3 than when other contents are displayed, the server 5 may make a proposal to the user with a statement such as "Would you like to see a foreign bus next?." Not only performing such proposals related to image information, but the server 5 can make similar proposals related to sound information. This function is useful in developing intellectual curiosity of the user 3. Moreover, the server may provide advice or education guidance for the user 3 to the second person 15 via the information terminal 6, such as providing a statement "The infant seems to be very interested in transportation in the city. Would it be necessary to increase the frequency of providing related basic knowledge?"

In the second PA 2, the input interface 1k may be a touch panel or any other device extending over the screen of the display 1u. The user 3 can operate the input interface 1k to select a desired content. Of course, the second person 15 may also operate the input interface 1k to enter the state of the user 3 in the same manner as the first PA 1. For example, in the second period T2, when recognizing that the user 3 feels at ease while listening to a specific song, the second person 15 can enter a subjective judgement about the state of the user 3 such as "calm."

Next, during a period from the first period T1 to the second period T2, how the first sensor group 41 for the first PA 1 and the second sensor group 42 for the second PA 2 are used will be described with reference to FIGS. 3 and 4 in combination with FIG. 2.

In the first period T1, the first PA 1 is used by the user 3, and the first PA 1 acquires information from the first sensor group 41. In the first period T1, the state of the user 3 is estimated as a mood index based on outputs of the first sensor group 41. However, the usage of signals from the respective sensors used in deriving mood indexes changes as the user 3 grows. In the fourth period T4, which occupies at least the first half of the first period T1, a mood index is derived based on outputs of all the sensors included in the first sensor group 41. As the user 3 grows out of diapers, for example, the usage of the output signals from the odor sensor 1g gradually decreases. After a rational aspect appears in the user 3's behavior, the usage of output signals from the pressure sensor 1h, the acceleration sensor 1i, and the angular velocity sensor 1j, decreases in a similar manner.

The term "decrease in usage" as used herein refers to a decrease in the frequency of the use of characteristic input data to a learning model, while increasing the use of other input data such as image information, sound information, and information acquired from the vital sensor 7 in further training the learning model. This involves a substantial decline in the weight of output signals from certain sensors such as the odor sensor 1g.

In the latter half of the first period T1, the user exhibits improved language ability and more expressive facial signals, and starts to move around. Thus, in this period, mood indexes to be generated are more affected by, among the information acquired by the first sensor group 41, image information acquired by the camera 1e, sound information acquired by the microphone 1f, and information acquired by the vital sensor 7 such as pulse information.

Since the growth of the user 3 is continuous, there is no rapid change in the language ability of the user 3 from at least the end of the first period T1 to at least the beginning of the second period T2. Thus, in the early stage of the second period T2, mood indexes to be generated are affected by, among the information acquired by the second sensor group 42 for the second PA 2, image information acquired by the camera 1e, sound information acquired by the microphone 1f, and information acquired by the vital sensor 7 such as pulse information.

Therefore, in the third period T3 which bridges the first period T1 and the second period T2, the state of the user 3 is estimated based on information acquired by the camera 1e, the microphone 1f, and the vital sensor 7, which are "common sensors" that acquire attributes (image, sound, and vital information, in this case) common to the first period T1 and the second period T2. The common sensors need to include at least the camera 1e and the microphone 1f.

Thus, the personal assistant control system S1 of the first embodiment includes: the first PA 1 which is used by the user 3 in the first period T1 and configured to acquire information from the first sensor group 41 including a plurality of sensors; the second PA 2 which is used by the same user 3 in the second period T2 and configured to acquire information from the second sensor group 42 including a plurality of sensors; and the server 5 which is connected to the first PA 1 and the second PA 2 via the network 4 and configured to estimate a state of the user 3 based on information acquired from the first sensor group 41 or the second sensor group 42. Furthermore, in the third period T3 that bridges the first period T1 and the second period T2, the server 5 estimates the state of the user 3 based on information acquired from "common sensors" which are specific types of sensors included in both the first sensor group 41 and the second sensor group 42 and configured to acquire at least common attributes (at least image and sound). In FIGS. 3 and 4, the "common sensors" are marked with black squares.

In the fourth period T4, a part of the first period T1 which is not included in the third period T3, in generating mood indexes, information from a sensor(s) other than the "common sensors" (i.e., the camera 1e, the microphone 1f, and the vital sensor 7) is also used; that is, information from at least one of "non-common sensors" (i.e., the odor sensor 1g, the pressure sensor 1h, the acceleration sensor 1i, and the angular velocity sensor 1j) is also used to generate mood indexes. The "non-common sensors" do not necessarily include all the sensors other than the common sensors, and may only include some of those sensors selected as appropriate, for example, by excluding the pressure sensor 1h. In this way, in the fourth period T4, the server 5 in the personal assistant control system S1 estimates a state of the user 3 by also using information acquired from the non-common sensors other than the common sensors in the first sensor group 41. In other words, in the third period T3, the server 5 uses only the information acquired from the common sensors, and in the fourth period T4, the server also uses the information acquired from the non-common sensors, and in either case, the server uses the information to derive mood indexes as common indexes (which can be commonly used in these periods).

In the second period T2 in which the second PA 2 is used, the server 5 not only uses information acquired by the common sensors in the second sensor group 42 (i.e. the camera 1e, the microphone 1f, and the vital sensor 7), but also uses additional information acquired by the first position information sensor 1t and the second position information sensor 8, to thereby generate mood indexes. Mood indexes are commonly used in both the first period T1 and the second period T2. Thus, when the second PA 2 is caused to provide a certain response to the user 3 based on a mood index generated during the second period T2, the response refers to (reflects) data of the response contents in association with mood indexes learned in the first period T1. However, the second PA 2 is provided with the display 1u, which the first PA 1 does not include. Thus, even when a certain response was made by the first PA 1 via the speaker 1m, the server controller 5n may make a similar response via the display 1u using text information, for example. In this case, the server controller 5n may respond with text information in combination with sound information from the speaker 1m, for example. Furthermore, the server evaluates which combination of elements of the output interface 53 makes the user 3 more calm and then adds the evaluation result to the learned response records.

As described above, in the first period T1, an action of the second person 15 is learned in association with a state (mood index) of the user based on information acquired by the first sensor group 41. In the second period T2, the mood index of the user 3 is derived based on information acquired by the second sensor group 42. Then, based on the derived mood index, the second PA 2 reproduces the action of the second person 15 (such as speaking to the user 3) learned in the first period T1.

First Variant of First Embodiment

Figure 5:
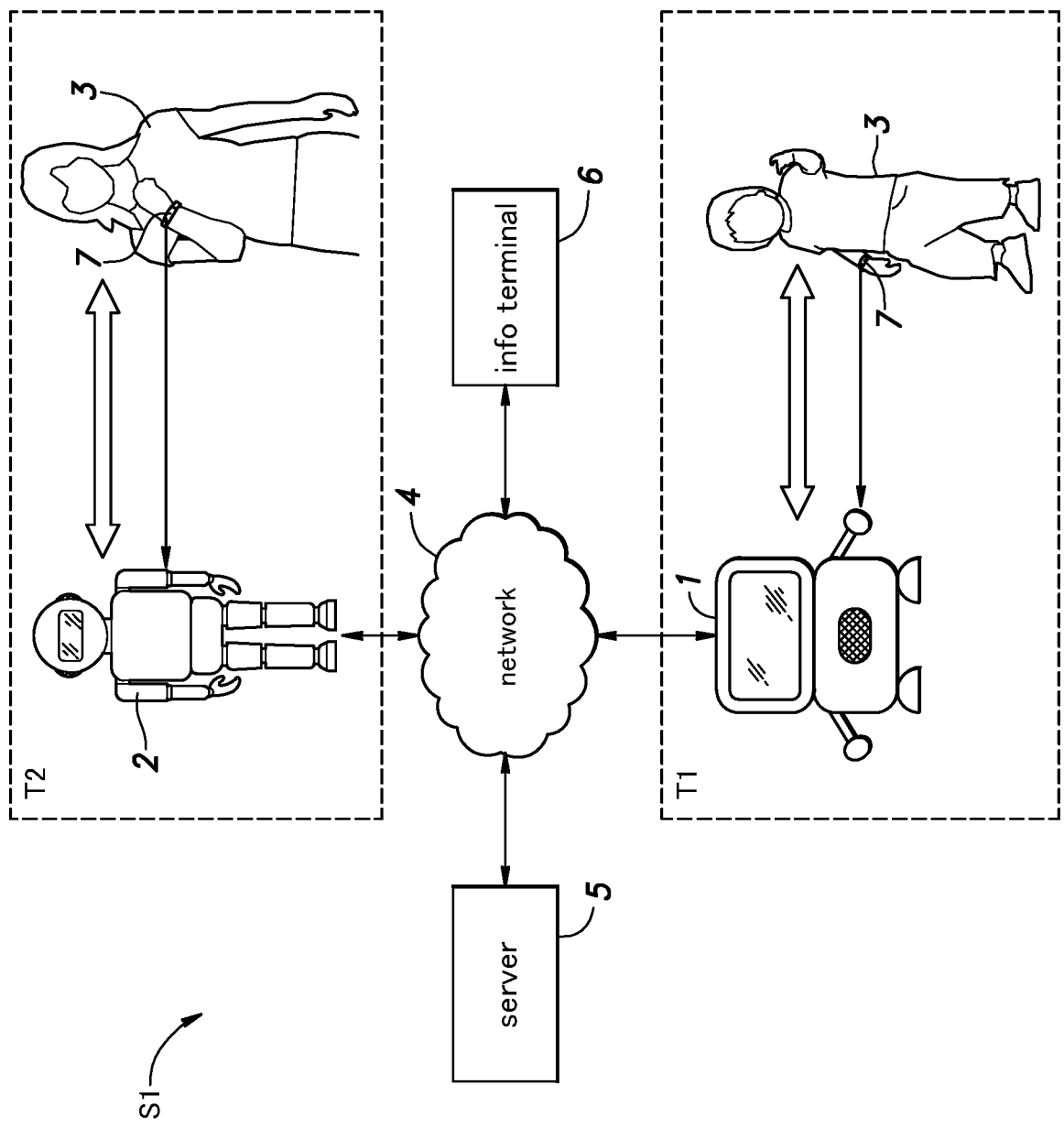
FIG. 5 is an explanatory diagram showing an outline of a personal assistant control system S1 in a first period T1 and a second period T2, in accordance with a first variant of the first embodiment of the present invention.

FIG. 5 is an explanatory diagram showing an outline of a personal assistant control system S1 in a first period T1 and a second period T2, in accordance with a first variant of the first embodiment of the present invention. In FIG. 1, the first period T1 is from a baby infant period of the user 3 to the first half of an infant period of the user 3, and the second period T2 is the latter half of the infant period of the user 3. In the first variant, the system is configured on the assumption that the first period T1 is the last half of an infant period of the user 3, and that the second period T2 is an adult period of the user 3.

In the first embodiment, a person who uses the information terminal 6 is the second person 15. However, in the first variant, in the second period T2, a user 3 who has grown into an adult mainly uses the information terminal 6. In addition, in the first variant, a second PA 2 autonomously interacts with the user 3 and in a movable form (e.g., in the form of a bipedal walking robot or a device with a movement mechanism) so that the second PA 2 can properly support the user who has grown into the adult. However, when the second PA 2 is carried by the user 3, the second PA 2 may lack a movement mechanism.

Figure 6:
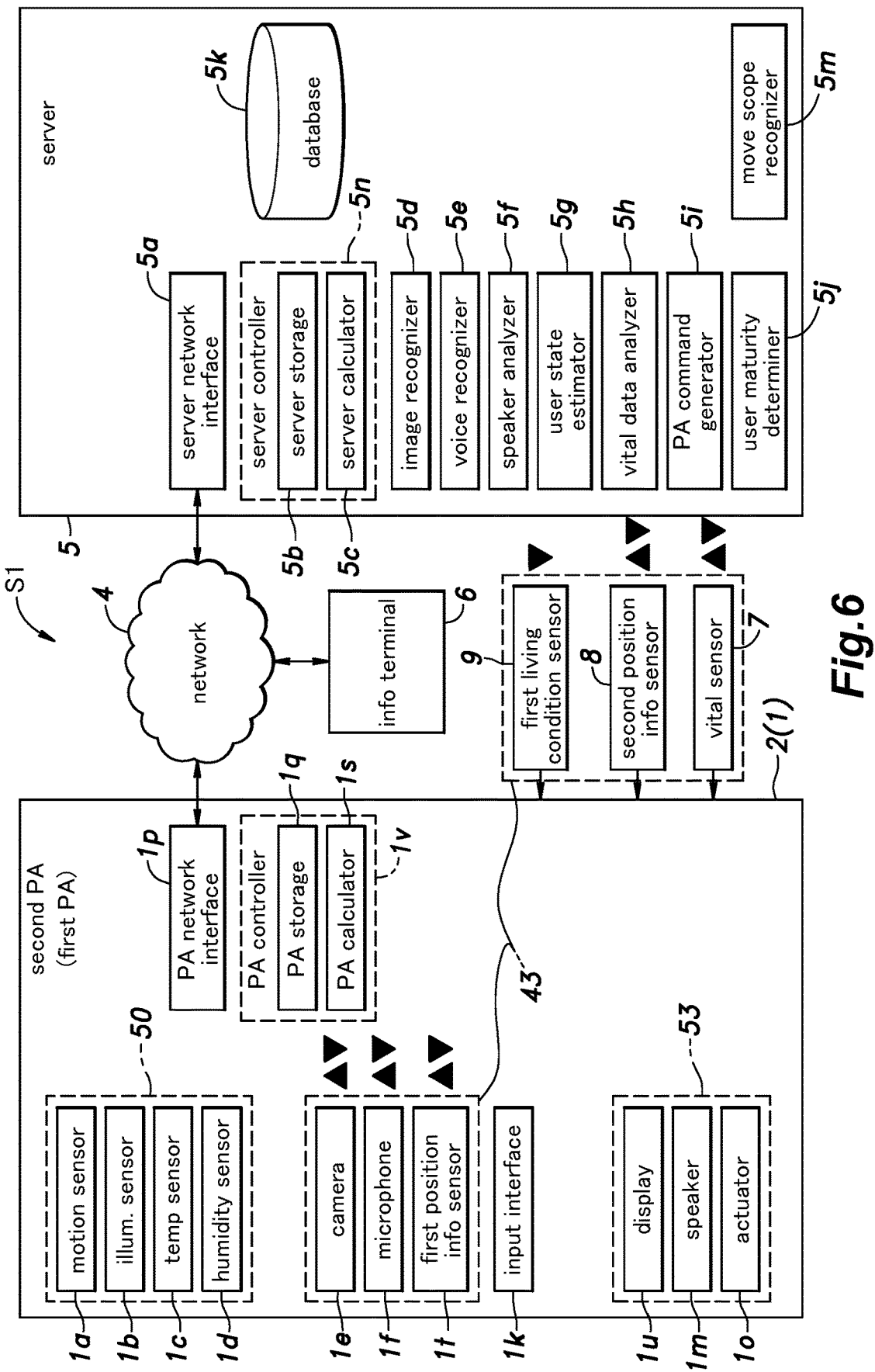
FIG. 6 is a block diagram showing a configuration of the personal assistant control system S1 in the second period T2, in accordance with the first variant of the first embodiment of the present invention.

FIG. 6 is a block diagram showing a configuration of the personal assistant control system S1 in the second period T2, in accordance with the first variant of the first embodiment of the present invention. A configuration and functions of the second PA 2 used for the second period T2 according to the first variant will be described with reference to FIG. 6 in combination with FIG. 4. In the first variant, since the second PA 2 shown in FIG. 4 is used in the first period T1, the second PA 2 corresponds to the first PA 1 of the first embodiment.

As shown in the figures, in the first variant, the second PA 2 includes a third sensor group 43 (corresponding to the second sensor group 42 in FIG. 4). The third sensor group 43 is different from the second sensor group 42 (see FIG. 4) described above, in that the third sensor group 43 further includes a first living condition sensor 9. The first living condition sensor 9 refers to a sensor for measuring, for example, the user's power usage, the users' gas usage, the amount of water and sewer, or any other utility used by the user, which is also referred to as a smart meter. When a user becomes an adult, the user often starts living independently of the user's parents. The measurements of the smart meter reflect the living pattern of the user 3, and thus affect the mood index that indicates a state of the user 3. With the use of the first living condition sensor 9, when detecting that almost the same life pattern repeats for a month, including Saturday, Sunday, and other holidays, the user state estimator 5g can estimate that the user 3 is likely to be "depressed" or "out of energy", for example.

Further, in the first variant, mood indexes further include those indicating physical states such as "tired" and "dull"

and those indicating mental states such as "exhausted", which are unlikely to occur when the user 3 is an infant or a young child. In other words, in the first variant, the scope of mood indexes is expanded. The expansion of the scope of mood indexes may be made by retraining a learning model or using a different learning model in a parallel manner. Moreover, in order to expand the scope of mood indexes, the first living condition sensor 9 may include additional measuring devices such as a weight scale and a sphygmomanometer. In other cases, the input interface 1k may be operated by the user 3 to enter menus and/or calorie values of daily meals.

In the first embodiment, when the user 3 is a baby or an infant, the input interface 1k is used by a second person 15 such as the mother, as mean to enter a state of the user 3 based on the subjective observation. In the first variant, the input interface 1k is used by the user 3 as means for notifying the second PA 2 (and thus, the server 5) of the user's states. As described above, the learning model is retrained or additionally trained based on input data from the input interface 1k. When a response provided by the second PA 2 is not relevant to the subjective state of the user 3, the user 3 operates the input interface 1k, being motivated to be better understood by the system. Then, the server controller 5n retrains or additionally trains the learning model based on the user's entries through the input interface 1k so that the interaction between the user 3 and the second PA 2 becomes more preferable.

As shown in FIGS. 4 and 6, the "common sensors" in the first variant are a camera 1e, a microphone 1f, a first position information sensor 1t, a vital sensor 7, and a second position information sensor 8. In FIGS. 4 and 6, the "common sensors" are marked with black triangles.

In the first variant, in the third period T3 which bridges the first period T1 and the second period T2, the user state estimator 5g estimates a state of the user 3 based on information acquired by the camera 1e, the microphone 1f, the first position information sensor 1t, the vital sensor 7, and the second position information sensor 8. The camera 1e, the microphone 1f, the first position information sensor 1t, the vital sensor 7, and the second position information sensor 8 are common sensors for acquiring attributes (image, sound, vital information, and position information in this case) common to the first period T1 and the second period T2.

Second Variant of First Embodiment

Figure 7:
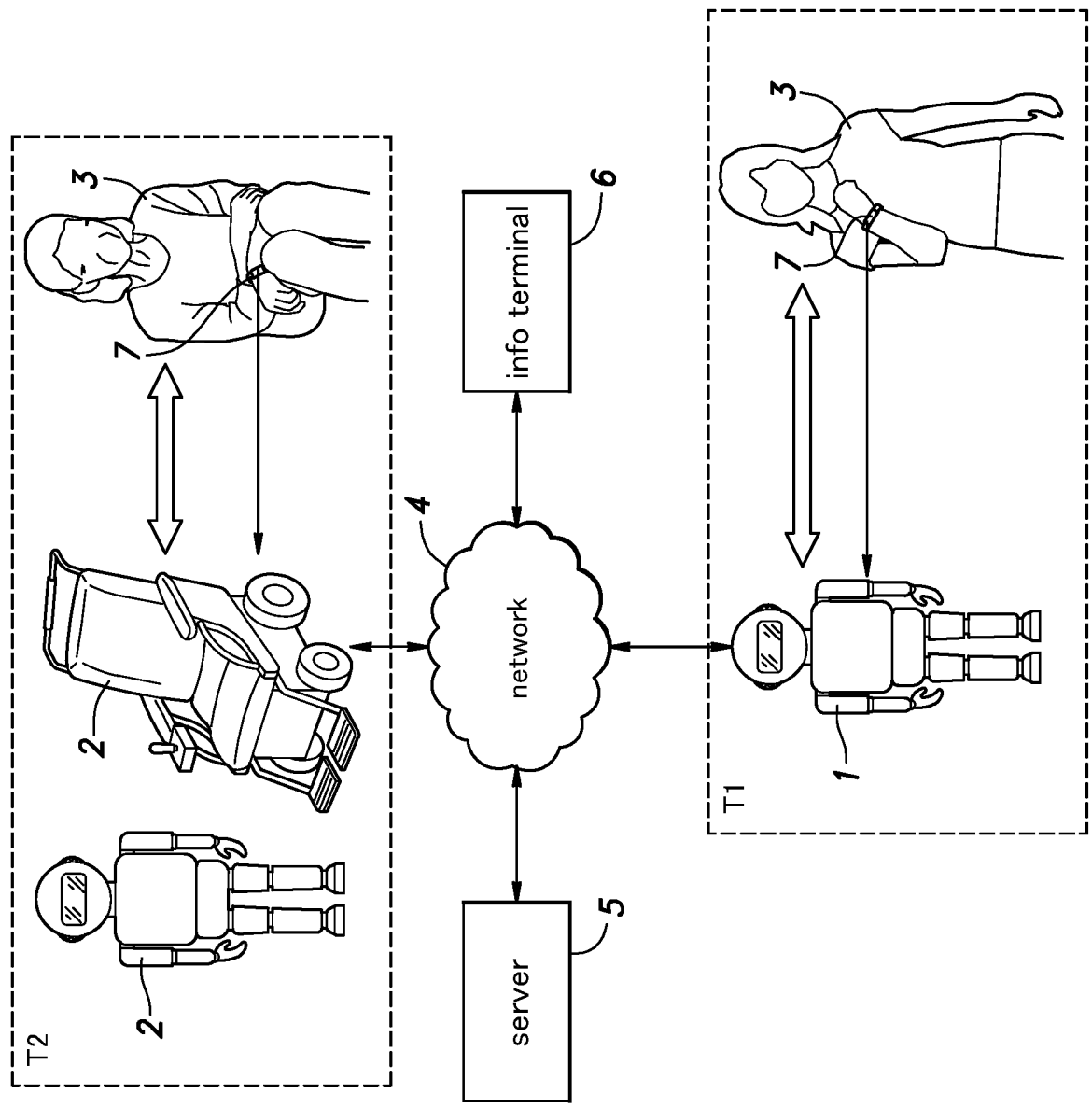
FIG. 7 is an explanatory diagram showing an outline of a personal assistant control system S1 in a first period T1 and a second period T2, in accordance with a second variant of the first embodiment of the present invention.

FIG. 7 is an explanatory diagram showing an outline of a personal assistant control system S1 in a first period T1 and a second period T2, in accordance with a second variant of the first embodiment of the present invention. In the first variant, the first period T1 is the last half of an infant period of the user 3, and the second period T2 is an adult period of the user 3. In the second variant, the system is configured on the assumption that the first period T1 is an adult period of the user 3, and that the second period T2 is an elderly period of the user 3.

In FIG. 7, since the user 3 in the second period T2 is an elderly person, the information terminal 6 is mainly used by a second person 15 who cares for the user 3 (of course, the user 3 themselves may use it). The second PA 2 may be in a movable form as in the first variant. The second PA 2 may be in the form of an electric wheelchair in which the user 3 can be seated to move. Of course, when the second PA 2 is carried by the user 3, the second PA 2 may lack a movement mechanism.

Figure 8:
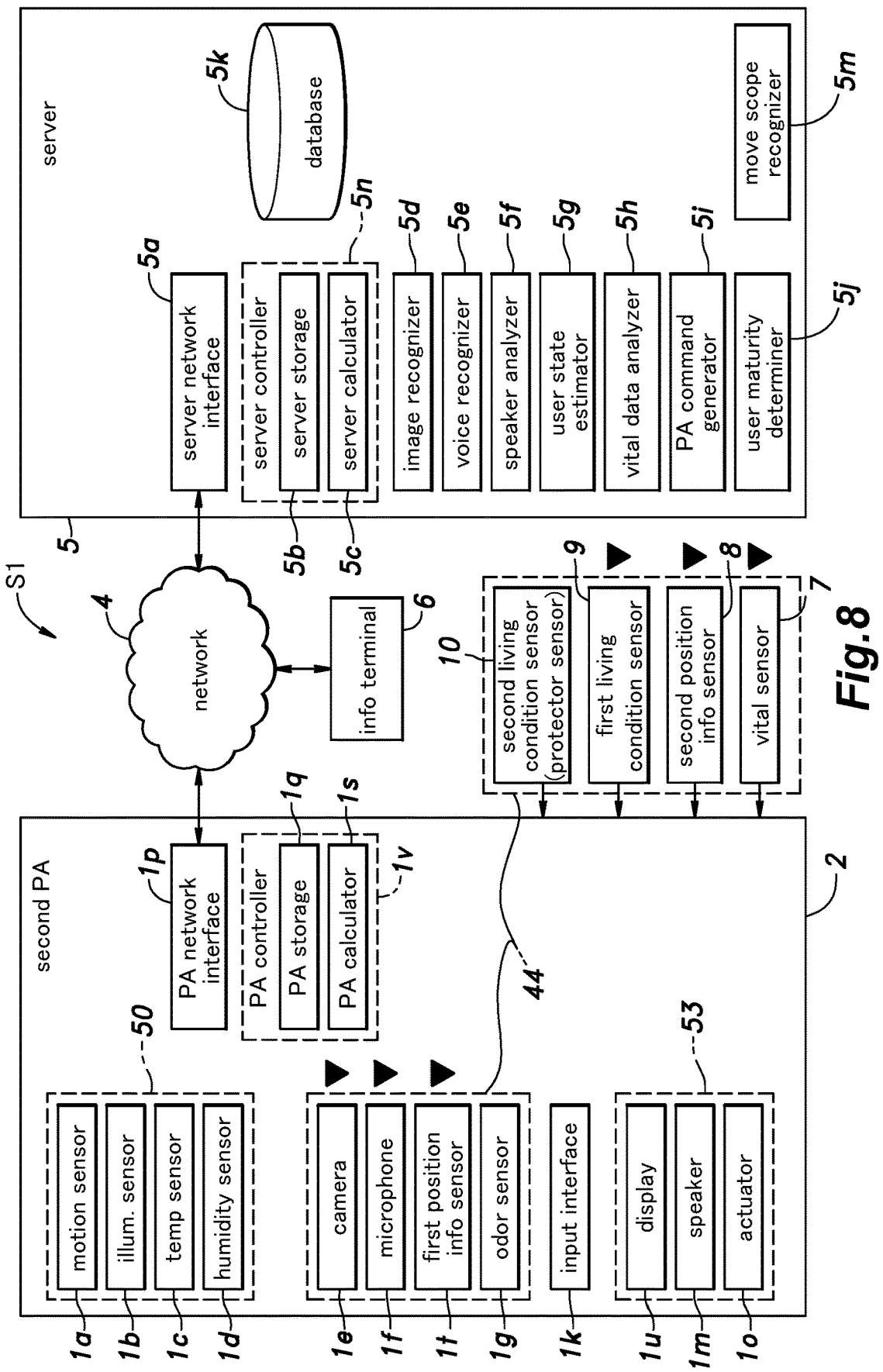
FIG. 8 is a block diagram showing a configuration of the personal assistant control system S1 in the second period T2, in accordance with the second variant of the first embodiment of the present invention.

FIG. 8 is a block diagram showing a configuration of the personal assistant control system S1 in the second period T2, in accordance with the second variant of the first embodiment of the present invention. A configuration and functions of the second PA 2 used for the second period T2 according to the second variant will be described with reference to FIG. 8 in combination with FIG. 6. In the second variant, since the second PA 2 shown in FIG. 6 is used in the first period T1, the second PA 2 corresponds to the first PA 1 of the first embodiment.

As shown in the figure, the second PA 2 includes a fourth sensor group 44 (corresponding to the second sensor group 42 in FIG. 4). The fourth sensor group 44 is different from the third sensor group 43 (see FIG. 6) described above, in that the fourth sensor group 44 further includes an odor sensor 1g and a second living condition sensor 10. The odor sensor 1g is used to detect an odor caused due to incontinence of the user 3. Examples of the second living condition sensor 10 include a door sensor for detecting that the user 3 is moving from one room to another, and a mat sensor provided on the bed for detecting the user 3's state when waking up. The mat sensor is comprised primarily of a sensor for detecting pressure and acceleration. In other words, the second living condition sensor 10 is a sensor used mainly for watching over the elderly.

For example, measurements of the mat sensor reflect a living pattern of the user 3, and thus affect the mood index that indicates the state of the user 3. With the use of the second living condition sensor 10, when the door sensor detects a reduced number of times the user moves across the door and the mat sensor detects that the user is in the bed almost all day, for example, the user state estimator 5g can estimate that the user 3 is likely to be "depressed" or "out of energy." In particular, when the user state estimator detects that the user is likely to be "out of energy" despite no abnormality in information from the vital sensor 7 (such as pulse information), since such states can directly lead the frailty of an elderly, the server controller 5n can perform necessary interactions with the user 3 via the second PA 2, such as encouraging the user to go out.

As shown in FIGS. 6 and 8, the "common sensors" in the second variant are a camera 1e, a microphone 1f, a first position information sensor 1t, a vital sensor 7, a second position information sensor 8, and a first living condition sensor 9. In FIGS. 4 and 6, the "common sensors" are marked with black inverted triangles.

In the second variant, in the third period T3 which bridges the first period T1 and the second period T2, the user state estimator 5g estimates a state of the user 3 based on information acquired by the camera 1e, the microphone 1f, the first position information sensor 1t, the vital sensor 7, the second position information sensor 8 and the living condition sensor 9. The camera 1e, the microphone 1f, the first position information sensor 1t, the vital sensor 7, the second position information sensor 8, and the living condition sensor 9 are common sensors for acquiring attributes (image, sound, vital information, and position information, living-related information such as power usage in this case) common to the first period T1 and the second period T2.

When the second PA 2 is provided with a mechanism for transporting the user 3 such as an electric wheelchair, the user 3 may be seated in the second PA 2 and go out. In this case, the first position information sensor 1t is desirably a positioning sensor using GPS or any other positioning system. When the user 3 is located outdoors together with the second PA 2, output signals from the first living condition sensor 9, which comprises a smart meter or the like, is not used for deriving mood indexes. Even in such cases, the learning model can be used to derive mood indexes through clustering in multidimensional space. Of course, different learning models may be prepared for indoors and outdoors so that the models are exchanged as the user moves between indoors and outdoors.

As described in detail above, in the personal assistant control system S1 according to the present invention, personal assistants can continuously provide services to the user 3 over generations. In this sense, the personal assistant control system S1 can be considered as a platform; that is, can be referred to as a personal assistant platform or a personal robot platform.

Second Embodiment

Hereinafter, a second embodiment of the present invention will be described with reference to the appended drawings. FIG. 9 is an explanatory diagram showing an outline of a personal assistant control system S1 in a first period T1 and a pre-birth period T0, in accordance with the second embodiment of the present invention. In the first embodiment, the system configured to be used after the birth of the user 3. The second embodiment is different from the first embodiment in that the system is configured to be used not only after the birth, but also in a fetal period of the user 3. In the following description, a first PA 1, a server 5, and an information terminal 6 are equivalent to those used in the first embodiment, and thus these elements are denoted with like reference numerals without repeating the description of such elements.

As shown in FIG. 9, the personal assistant control system S1 includes the first PA 1, a pre-birth period personal assistant (hereinafter, also referred to as "pre-birth period PA 20"), a network 4 to which the first PA 1 and the pre-birth period PA 20 are connected, the server 5 connected to the network 4, and the information terminal 6 connected to the network 4.

The first PA 1 and the pre-birth period PA 20 are preferably robots, for example. Each PA may be provided with or without a displacement mechanism such as an arm or a movement mechanism, as long as the PA is configured to be able to interact with a user 3.

In FIG. 9, the first PA 1 is used by the user 3 during the first period T1 (after birth). The pre-birth period PA 20 is used in the pre-birth period T0, which is a period before the birth of the user 3. Thus, in some cases, the personal assistant control system S1 may not include the first PA 1 and the pre-birth period PA 20 at the same time. Only a second person 15 directly uses the pre-birth period PA 20 in the pre-birth period T0. However, as both the pre-birth period PA 20 and the first PA 1 provide services to the same user 3 from a prenatal period to a postnatal period, it can be said that the user 3 indirectly uses the pre-birth period PA 20 in the pre-birth period T0.

The pre-birth period PA 20 used in the pre-birth period T0 is designed with lots of curved surfaces and is made of a flexible material so that the second person 15, who directly operates it, can feel safer. In other words, the pre-birth period PA 20 is designed on the assumption that the second person 15 holds the pre-birth period PA 20 in the chest or arms.

The pre-birth period PA 20 acquires various information records from a second sensor group 42 (see FIG. 11) described later. The pre-birth period PA 20 transmits at least a part of the acquired information to the server 5 via the network 4. The server 5 estimates a state of the user 3 inside the body of the second person 15 based on outputs signals of the second sensor group 42.

Based on the estimated state of the user 3, the server 5 provides a control command to the pre-birth period PA 20 via the network 4. Upon receiving the control command, the pre-birth period PA 20 outputs a voice or other sound that calms the user 3, for example. Then, the second sensor group 42 acquires the user's reaction or response to the voice or other sound, and the pre-birth period PA 20 also transmits the information records to the server 5. The server 5 learns what response content can more calm the user 3 depending on the state of the user 3, for example. As a result, when the same state of the user occurs next time, the server 5 can respond more properly based on the learning result. The learning result acquired in the pre-birth period T0 is inherited and used by the first PA 1 to interact with the user 3.

In the second embodiment, the information terminal 6 is owned by the second person 15. The server 5 transmits a state of the user 3 estimated based on information acquired from the pre-birth period PA 20 to the information terminal 6, and the second person 15 can grasp the state of the user 3 inside the body of the second person.

FIG. 9 shows a vital sensor 7 having a wristband shape, for example, and worn on the wrist or any other part of the body of the second person 15.

FIGS. 10A and 10B are explanatory diagrams showing the relationships among the pre-birth period T0, the first period T1, the second period T2, a third period T3, and a fourth period T4, in accordance with the second embodiment of the present invention.

As shown in FIGS. 10A and 10B, the pre-birth period T0 is a period before the first period T1. The pre-birth period T0 starts usually after conception and the second person 15 notices the pregnancy. The pre-birth period T0 ends at the time of birth. As shown in FIG. 10A, the first period T1 may starts immediately after the end of the pre-birth period T0. Alternatively, as shown in FIG. 10B, there may be a gap between the pre-birth period T0 and the first period T1. As described with reference to FIGS. 2A to 2D, there may be various temporal patterns of the first period T1 and the second period T2.

Figure 11:
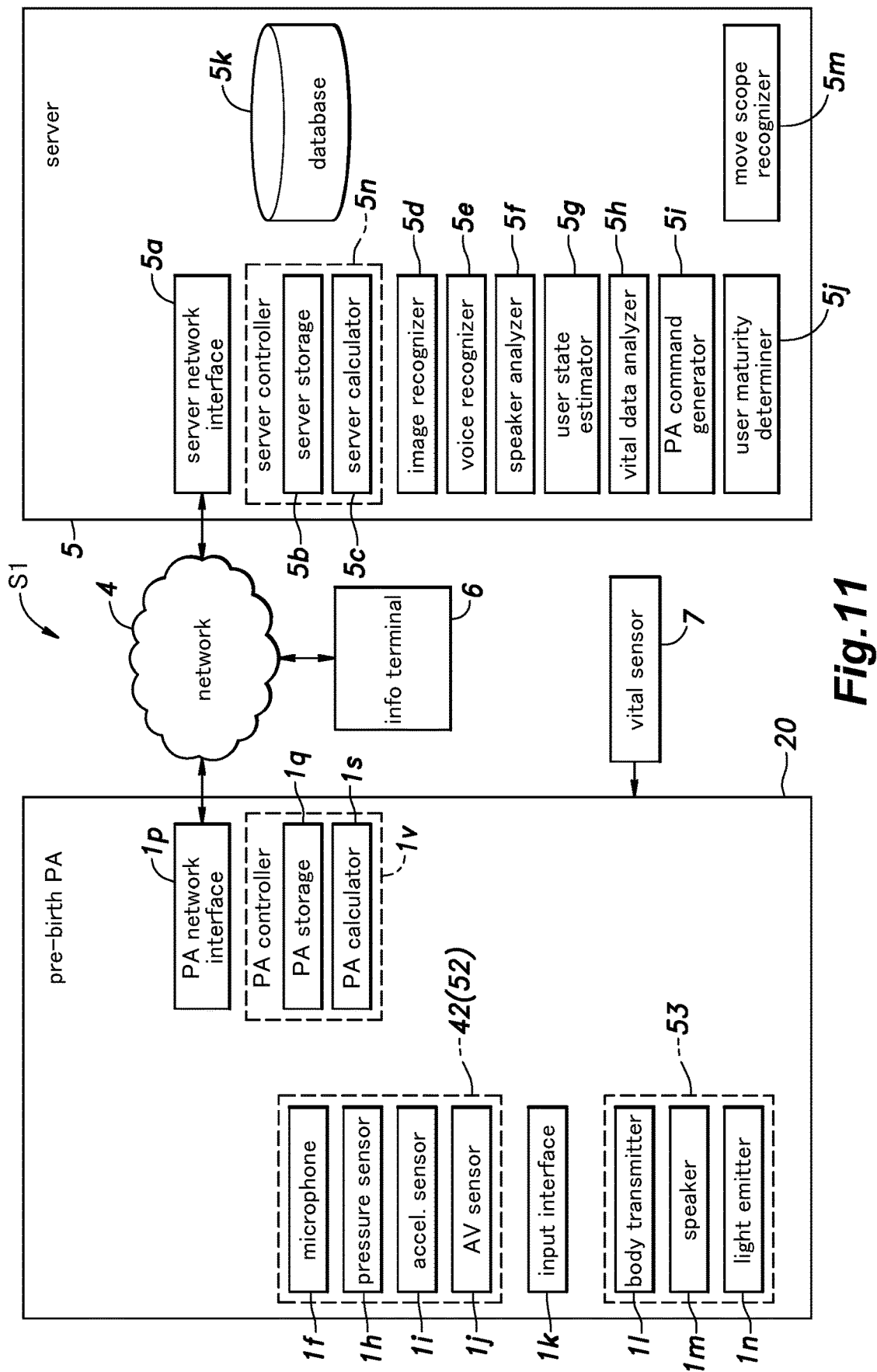
FIG. 11 is a block diagram showing a configuration of the personal assistant control system S1 in the pre-birth period T0 in accordance with the second embodiment of the present invention.

FIG. 11 is a block diagram showing a configuration of the personal assistant control system S1 in the pre-birth period T0 in accordance with the second embodiment of the present invention. The personal assistant control system S1 includes at least a pre-birth period PA 20 and a server 5. The pre-birth period PA 20 and the server 5 are connected via the network 4.

The pre-birth period PA 20 will be described. The pre-birth period PA 20 includes a second sensor group 42 and an output interface 53. Since a PA network interface $1p$, a PA calculator $1s$, a PA storage $1q$, and a PA controller are equivalent to those of the first PA 1 as described above, the description of these elements will not be repeated. The pre-birth period PA 20 is not equipped with the environment sensor 50 (see FIG. 3) in the first PA 1. However, since the mood of the second person 15 also affects the state of the user 3, the pre-birth period PA 20 may be configured to include an environment sensor 50 for monitoring the environment around the second person 15.

In the second embodiment, a microphone $1f$ acquires heartbeat sound of the user 3 when the user is a fetus, heartbeat sound of the second person 15, and voice issued by the second person 15. A pressure sensor $1h$, an acceleration sensor $1i$, and an angular velocity sensor $1j$ detect the heartbeat and fetal movement of the user 3. The pre-birth period PA 20 acquires and transmits voice information, heartbeat sound information, heartbeat information, and fetal movement information to the server 5, where the information records are stored in the database 5k.

In the second embodiment, the vital sensor 7 is used to measure the state of the second person 15, not the user 3 (see FIG. 9). It is known that, when a pregnant mother, the second person in this case, "feels happy" or "feels good", secreted hormones such as dopamine and β-endorphin are provided to a fetus, i.e., the user 3, through the bloodstream, thereby making the fetus relaxed. Thus, to recognize the state of the second person 15 can be to indirectly recognize the state of the user 3.

A body transmitter 11 is formed with, for example, a film-like member provided on a part of the surface of the pre-birth period PA 120 and made of flexible material such as polypropylene (PP). The sound acquired by the microphone 1f is amplified by an amplifier (not shown). Moreover, the sound output from the speaker 1m is transmitted to the body of the second person 15 via the body transmitter 11 when the body transmitter 11 is in close contact with the body of the second person 15. The body transmitter 11 is used in certain situations such as a situation in which a second person 15 or their partner (for example, a father) speaks to a prenatal user 3 and a situation in which sound waves (for example, music) from the surroundings of the second person 15 is transmitted to the user 3.

Next, the functions of the server 5 will be described. As the configuration of the server 5 is the same as that of the first embodiment, the description about it will not be repeated. In the second embodiment, the user state estimator 5g uses information records acquired from the second sensor group 42 as input data to a learning model, to thereby derive a state (mood index) of the user 3, in the same manner as the first embodiment.

Examples of information records used as input data to the learning models include sound records of voice and heartbeat, heartbeat information, and fetal movement information acquired by the microphone 1f, pressure sensor 1h, acceleration sensor 1i, and angular velocity sensor 1j. When the user 3 is calm, the heartbeat is generally slow. Thus, the heartbeat can affect the mood index. In addition, it is said that a moderate fetal movement generally indicates a good communication between the user 3 and the second person 15. Thus, the fetal movement can affect the mood index.

Since these information records includes information records of the second person 15 such as the second person's heartbeat information, the server controller 5n performs a certain process such as frequency analysis on the acquired information records to thereby distinguish information records of the user 3 from those of the second person 15. Since it can be said that the user 3 and the second person 15 are emotionally synchronized, information that can be affected by the mood of the second person 15 (e.g., heartbeat information or information acquired by the vital sensor 7) may be added to the input data. However, in the second embodiment, since the user 3 is inside the body of the second person 15, the user state estimator 5g cannot estimate states of the user 3 that are likely to appear in facial expressions as in the case of the first embodiment, and can estimate only internal states such as "calm" or "excited."

The user state estimator 5g transmits a derived mood index to the server controller 5n. Upon receiving the mood index, the server controller 5n instructs the PA command generator 5i to extract a certain response from the response learned in the past. For example, in a state where the user 3 is "excited", the server controller 5n instructs the PA command generator 5i to extract, as a response, music or voice (such as mother's voice) which has been proven to change the state of the user from "excited" to "calm." Thus, the PA command generator 5i searches the database 5k, selects content data that is presumed to be appropriate, and provides an audio reproduction command to the pre-birth period PA 20. This response content is stored in the database 5k, and the relationship between the mood index and the response content is learned by the server.

Next, comparison will be made between attributes of information records acquired by the first sensor group 41 (see FIG. 3) of the first PA 1 used by the user 3 after birth, and those acquired by the second sensor group 42 of the pre-birth period PA 20.

In the first period T1, the first PA 1 shown in FIG. 3 uses at least the camera 1e and the microphone 1f (first attribute detection sensor 51) included in the first sensor group 41 to acquire attributes (first attributes) that can be called "mental attributes", such as the user 3's facial expression, voice, and vocabulary information. In the pre-birth period T0, the pre-birth period PA 20 uses the microphone 1f, the pressure sensor 1h, the acceleration sensor 1i, and the angular velocity sensor 1j (second attribute detection sensor 52) of the second sensor group 42 to acquires attributes (second attribute) that can be called "physical attributes", such as the user 3's heartbeat and fetal movement information. In the first period T1, the user state estimator 5g derives mood indexes of the user 3 based on the first attributes. In the pre-birth period T0, the user state estimator 5g derives mood indexes of the user 3 based on the second attributes. The first PA 1 is also provided with the pressure sensor 1h and some other sensors. However, as the user 3 grows, the pressure sensor 1h and other physical attribute sensors become less used to derive mood indexes, and the "mental attributes" suitable for estimating mental states become the primary factors in determining a mood index.

Thus, the personal assistant control system S1 of the second embodiment includes: the first PA 1 which is used by the user 3 in the first period T1 and configured to acquire information from the first sensor group 41 including a plurality of sensors; the second PA 2 which is used by the user 3 in the pre-birth period T0 and configured to acquire information from the second sensor group 42 including a plurality of sensors; and the server 5 which is connected to the first PA 1 and the pre-birth period PA 20 via the network 4 and configured to estimate a state of the user 3 based on the information acquired from the first sensor group 41 or the second sensor group 42. In the first period T1, the server 5 estimates a state of the user 3 based on information acquired from the first attribute detection sensor 51 which is included in the first sensor group 41 and detects at least the first attributes. In the pre-birth period T0, the server 5 estimates a state of the user 3 based on information acquired from the second attribute detection sensor 52 which is included in the second sensor group 42 and detects at least the second attributes that are different from the first attributes.

Importantly, although the first attribute detection sensor 51 used to acquire information in the first period T1 includes different types of sensors from those of the second attribute detection sensor 52 used to acquire information in the pre-birth period T0, the user state estimator 5g generates a state of the user 3 as a common mood index even when input data includes different types of attributes. By using such common mood indexes, a response content learned during the user 3's fetal period can be utilized even when the user 3 grows up to be a baby.

For example, the server controller 5n extracts an action such as the second person 15's speaking to the user 3 based on an analysis result from the speaker analyzer 5f which performs an analysis of voice acquired by the microphone 1f included in the second sensor group 42. The voice (response content) of the second person 15 speaking to the user 3 is stored in the database 5k as sound information, and is extracted as vocabulary words by the voice recognizer 5e. Also, the server acquires a mood index of the user 3 when the second person 15 performs the action. Then, the state of this interaction is also accumulated in the database 5k, whereby the action of the second person 15 (speaking to the user) is learned in association with the state (mood index) of the user 3 based on the information acquired by the second sensor group 42.

In addition, the server controller 5n is configured to be capable of recording, for example, the heartbeat sound of the second person 15 acquired by the microphone 1f in response to the second person 15's operation on the input interface 1k (including the generation of a command based on the recognition result by the voice recognizer 5e and the operation of the information terminal 6). Furthermore, the server controller 5n can also instruct the pre-birth period PA 20 to reproduce the recorded heartbeat sound in response to the second person 15's operation on the input interface 1k. Of course, in this case, the server also acquires a mood index of the user 3 in response to the second person 15's action (the operation on the input interface 1k, in this case). Then, the state of this interaction is also accumulated in the database 5k, whereby the action of the second person 15 (the reproduction of the heartbeat sound, in this case) is learned in association with the state (mood index) of the user 3 based on the information acquired by the second sensor group 42.

As a result of this learning, for example, the more frequently the mood index of the user 3 changes from "excited" to "calm" in response to the mother's saying "honey, you're so cute" or the reproduction of the heartbeat sound, the more likely the pre-birth period PA 20 reproduces the mother's voice "honey, you're so cute" or the heartbeat sound extracted from the sound information stored in the database 5k (before receiving any instruction from the second person 15), in response to the state in which the mood index of user 3 becomes "excited."

This response content, i.e., the reproduction of the mother's voice or the heartbeat sound learned in the pre-birth period T0 is inherited and used in the first period T1 by using a common mood index. In the pre-birth period T0, the server 5 extracts a second person 15's action toward the user 3 based on information acquired from the second sensor group 42 (second attribute detection sensor 52), and learns the second person 15's action in association with the state of the user 3 generated based on information acquired by the second attribute detection sensor 52. In the first period T1 after the birth of the user 3, in response to the state of user 3 estimated from information acquired by the first attribute detection sensor 51 (see FIG. 3), the server 5 instructs the first PA 1 to reproduce at least part of the action of the second person 15 learned in the pre-birth period T0. Specifically, in response to a certain state of the user 3, a corresponding response content such as the heartbeat sound recorded in the pre-birth period T0 can be reproduced in the first period T1 as well.

Variant of Second Embodiment

FIG. 12 is an explanatory diagram showing an outline of a personal assistant control system S1 in a first period T1 and a pre-birth period T0, in accordance with a variant of the second embodiment of the present invention. In the second embodiment described above, the first PA 1 used in the first period T1 and the pre-birth period PA 20 used in the pre-period T0 are different robots. In the variant of the second embodiment, the same (single) PA (first PA 1) is used in both the first period T1 and the pre-birth period T0. The variant of the second embodiment will be described in the followings with reference to FIG. 3.

As shown in FIG. 3, the first PA 1 acquires information from the first sensor group 41. Among sensors included in the first sensor group 41, the camera 1e and the microphone 1f are included in the first attribute detection sensor 51 as described above, and the microphone 1f, the pressure sensor 1h, the acceleration sensor 1i, and the angular velocity sensor 1j are included in the second attribute detection sensor 52. Thus, the microphone 1f, which is common to the first and second attribute detection sensors, is commonly used to acquire a "physical attribute" in the pre-birth period T0 and a "mental attribute" in the first period T1.

Similarly to the second embodiment, the personal assistant control system S1 of the variant of the second embodiment includes the first PA 1 which is used by the user 3 in the first period T1 and configured to acquire information from the first sensor group 41 including a plurality of sensors; and the server 5 which is connected to the first PA 1 via a network 4 and configured to estimate a state of the user 3 based on information acquired from the first sensor group 41. In the first period T1, the server 5 estimates a state of the user 3 based on information acquired from the first attribute detection sensor 51 which is included in the first sensor group 41 and detects at least the first attributes. In the pre-birth period T0 before the first period T1, the server 5 estimates a state of the user based on information acquired from the second attribute detection sensor 52 which is included in the first sensor group 41 and detects at least the second attributes that are different from the first attributes. In the variant of the second embodiment, the user state estimator 5g generates a mood index, which is commonly used in the both periods, based on information acquired by the first attribute detection sensor 51 and information acquired by the second attribute detection sensor 52 that detects attributes different from those detected by the first attribute detection sensor 51, as in the second embodiment.

Furthermore, in the pre-birth period T0, the server 5 extracts a second person 15's action toward the user 3 based on information acquired from the first sensor group 41, and learns the second person 15's action in association with the state of the user 3 generated based on information acquired by the second attribute detection sensor 52. In the first period T1, in response to the state of user 3 estimated from information acquired by the first attribute detection sensor 51, the server 5 instructs the first PA 1 to reproduce at least part of the action of the second person 15 learned in the pre-birth period T0.

The first PA 1 includes a microphone 1f, an amplifier (not shown) for amplifying sound acquired by the microphone 1f, a speaker 1m for reproducing audio signals amplified by the amplifier, and a body transmitter for transmitting the sound reproduced by the speaker 1m to the body of the second person 15.

The personal assistant control system S1 according to the present invention has been described in terms of specific embodiments, but is not limited by such embodiments. For example, types of sensors included in the first sensor group 41 and the second sensor group 42 can be appropriately selected, and is not limited to sets of sensor types described in the above-described embodiments. In the above embodiments, personal assistants used for a baby period, an infant period, an adult period and an elderly period are described. In other embodiments, the life-span (the process of growth) of humans may be divided into more periods than those four periods, where a personal assistant is properly configured for each period.

INDUSTRIAL APPLICABILITY

A personal assistant control system S1 of the present invention enables a robot or a personal assistant to properly support a user by serving as a partner of the user, which is more than just a tool, according to the user's growth, even though personal assistants are replaced at times as the user grows over periods including a fetal period, and thus is useful as a platform for personal assistant equipment, for example.

Glossary 1 first PA (first personal assistant)
1e camera
1f microphone
1u display
2 second PA (second personal assistant)
3 users
4 network
5 servers
6 information terminal
7 vital sensor
15 second person
20 pre-birth period PA (pre-birth period personal assistant)
41 first sensor group
42 second sensor group
43 third sensor group
44 fourth sensor group
50 environment sensor
51 first attribute detection sensor
52 second attribute detection sensor
S1 personal assistant control system

The invention claimed is:

1. A personal assistant control system comprising:
a first personal assistant which is used by a user in a first period and configured to acquire information from a first sensor group, the first sensor group comprising a plurality of sensors;
a second personal assistant which is used by the user in a second period and configured to acquire information from a second sensor group, the second sensor group comprising a plurality of sensors; and
a server which is connected to the first personal assistant and the second personal assistant via a network, and configured to estimate a state of the user based on information acquired from the first sensor group or the second sensor group,
wherein, in the first period, the server extracts an action of a second person toward the user based on information acquired from the first sensor group, and learns the action of the second person in association with a state of the user estimated based on information acquired from the first sensor group;
in the second period, based on the state of the user estimated from information acquired from the second sensor group, the server instructs the second personal assistant to reproduce at least a part of the action of the second person learned in the first period; and
in a third period that bridges the first period and the second period, the server estimates the state of the user based on information acquired from one or more common sensors which are specific types of sensors included in both the first sensor group and the second sensor group and are configured to acquire at least common attributes.

2. The personal assistant control system according to claim 1, wherein the first period includes a period before the second period,
wherein, in a fourth period which is included in the first period but not included in the third period, the server estimates a state of the user by referring at least to information acquired from one or more non-common sensors which are specific types of sensors included in the first sensor group and are not the common sensors.

3. The personal assistant control system according to claim 2, wherein the one or more non-common sensors include at least one selected form the group consisting of an odor sensor, a pressure sensor, an acceleration sensor, and an angular velocity sensor.

4. The personal assistant control system according to claim 1, wherein the common sensors include at least a microphone used as a sensor for detecting sound and a camera used as a sensor for acquiring images.

5. The personal assistant control system according to claim 1, wherein the server further comprises:
a voice recognizer for performing a speech recognition operation on information from microphones included in the first sensor group and the second sensor group and used as sensors for detecting sound; and
a user maturity determiner for determining a maturity level of the user based on at least one selected from the group consisting of a number of vocabulary words, difficulty levels of vocabulary words, and a degree of recognition certainty, which are recognized by the voice recognizer.

6. The personal assistant control system according to claim 5, wherein, based on a determination result output from the user maturity determiner, the server encourages the user or a second person to replace the first personal assistant with the second personal assistant.

7. The personal assistant control system according to claim 1, wherein the first period includes a period before the second period,
wherein the server is configured such that:
in the first period, the server estimates a state of the user based on information acquired from the first sensor group, and, based on the estimated state of the user, provide a response to the user via a first user interface provided in the first personal assistant and learns the response in association with the state of the user; and
in the second period, the server estimates a state of the user based on information acquired from the second sensor group, and, based on the estimated state of the user, refers to the response learned in the first period and provides the response to the user via a second user interface provided in the second personal assistant.

8. The personal assistant control system according to claim 7, wherein the first user interface comprises at least one selected from the group consisting of a speaker, a light emitter, and a vibrator, and wherein the second user interface comprises at least one selected from the group consisting of a speaker, a display, and an actuator.

9. A personal assistant control system comprising:
   a first personal assistant which is used by a user in a first period and configured to acquire information from a first sensor group, the first sensor group comprising a plurality of sensors; and
   a server which is connected to the first personal assistant via a network, and configured to estimate a state of the user based on information acquired from the first sensor group,
   wherein the server is configured such that:
   in the first period, the server estimates a state of the user based on information acquired from a first attribute detection sensor included in the first sensor group, the first attribute detection sensor being configured to detect at least a first attribute; and
   in a pre-birth period before the first period, the server estimates a state of the user based on information acquired from a second attribute detection sensor included in the first sensor group, the second attribute detection sensor being configured to detect at least a second attribute that is different from the first attribute.

10. The personal assistant control system according to claim 9, wherein the server is configured to such that:
   in the pre-birth period, the server extracts an action of a second person toward the user based on information acquired from the first sensor group, and learns the action of the second person in association with a state of the user estimated based on information acquired from the second attribute detection sensor; and
   in the first period, based on the state of the user estimated from information acquired from the first attribute detection sensor, the server instructs the first personal assistant to reproduce at least a part of the action of the second person learned in the pre-birth period.

11. The personal assistant control system according to claim 10, wherein the first personal assistant further comprises:
   a microphone as a sensor for acquiring sound;
   an amplifier for amplifying the sound acquired by the microphone;
   a speaker for reproducing an audio signal amplified by the amplifier; and
   a body transmitter for transmitting the sound reproduced by the speaker into the body of the second person.

12. The personal assistant control system according to claim 10, wherein the server derives one or more common indexes based on first information acquired by the first attribute detection sensor and second information acquired by the second attribute detection sensor, the second information including a different attribute from that included in the first information.

13. The personal assistant control system according to claim 9, wherein the pre-birth period is a period before the birth of the user and the first period is a period after the birth of the user.

14. A personal assistant control system comprising:
   a first personal assistant which is used by a user in a first period and configured to acquire information from a first sensor group, the first sensor group comprising a plurality of sensors;
   a pre-birth period personal assistant which is used by the user in a pre-birth period before the first period, and configured to acquire information from a second sensor group, the second sensor group comprising a plurality of sensors; and
   a server which is connected to the first personal assistant and the pre-birth period personal assistant via a network, and configured to estimate a state of the user based on information acquired from the first sensor group or the second sensor group,
   wherein the server is configured such that:
   in the first period, the server estimates a state of the user based on information acquired from a first attribute detection sensor included in the first sensor group, the first attribute detection sensor being configured to detect at least a first attribute; and
   in the pre-birth period, the server estimates a state of the user based on information acquired from a second attribute detection sensor included in the second sensor group, the second attribute detection sensor being configured to detect at least a second attribute that is different from the first attribute.

15. The personal assistant control system according to claim 14, wherein the server is configured to such that:
   in the pre-birth period, the server extracts an action of a second person toward the user based on information acquired from the second sensor group, and learns the action of the second person in association with a state of the user estimated based on information acquired from the second attribute detection sensor; and
   in the first period, based on the state of the user estimated from information acquired from the first attribute detection sensor, the server instructs the first personal assistant to reproduce at least a part of the action of the second person learned in the pre-birth period.

16. The personal assistant control system according to claim 15, wherein the pre-birth period personal assistant further comprises:
   a microphone as a sensor for acquiring sound;
   an amplifier for amplifying the sound acquired by the microphone;
   a speaker for reproducing an audio signal amplified by the amplifier; and
   a body transmitter for transmitting the sound reproduced by the speaker into the body of the second person.

* * * * *